US012057061B2

(12) United States Patent
Higashidani

(10) Patent No.: US 12,057,061 B2
(45) Date of Patent: Aug. 6, 2024

(54) DISPLAY DRIVING CIRCUIT, DISPLAY DEVICE, ROAD SIGN BOARD, AND DRIVING METHOD FOR DISPLAY DEVICE

(71) Applicant: NICHIA CORPORATION, Anan (JP)

(72) Inventor: Yasuo Higashidani, Tokushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/467,669

(22) Filed: Sep. 14, 2023

(65) Prior Publication Data

US 2024/0105110 A1 Mar. 28, 2024

(30) Foreign Application Priority Data

Sep. 22, 2022 (JP) ................................ 2022-151621

(51) Int. Cl.
*G09G 3/32* (2016.01)
*G09G 3/20* (2006.01)

(52) U.S. Cl.
CPC ............ *G09G 3/32* (2013.01); *G09G 3/2003* (2013.01); *G09G 2300/06* (2013.01); *G09G 2310/08* (2013.01); *G09G 2320/0238* (2013.01); *G09G 2320/04* (2013.01); *G09G 2330/021* (2013.01)

(58) Field of Classification Search
None
See application file for complete search history.

(56) References Cited

U.S. PATENT DOCUMENTS 6,020,865 A * 2/2000 Okuda ..................... G09G 3/32 345/82
6,064,357 A * 5/2000 Okuda ..................... G09G 3/30 345/82
9,613,561 B2 * 4/2017 Matsumoto .............. G09G 3/32
2003/0016189 A1 1/2003 Abe et al.
2004/0104686 A1 * 6/2004 Shin ..................... G09G 3/3266 315/169.3
2005/0012698 A1 * 1/2005 Takahashi ............ G09G 3/3216 345/77
2005/0093811 A1 5/2005 Ito
(Continued)

FOREIGN PATENT DOCUMENTS

JP 09-005775 1/1997
JP 09-325729 12/1997
(Continued)

*Primary Examiner* — Dorothy Harris
(74) *Attorney, Agent, or Firm* — MORI & WARD, LLP

(57) ABSTRACT

A display driving circuit drives a display unit including a plurality of light-emitting elements connected along respective common lines and arranged in a matrix. The driving circuit includes one or more element drivers for driving the plurality of light-emitting elements of the display unit, a memory that stores lighting period information indicating a lighting period in which each light-emitting element is lit by the one or more element drivers, an element lighting period controller that outputs the lighting period information stored in the memory to each element driver, a switching unit that selects each common line based on the lighting period information stored in the memory, and a common line lighting period controller that is interposed between the memory and the switching unit and controls a lighting period in which each common line is activated according to the lighting period information.

15 Claims, 15 Drawing Sheets

(56) References Cited

U.S. PATENT DOCUMENTS

| | | | |
|---|---|---|---|
| 2005/0231498 | A1 | 10/2005 | Abe et al. |
| 2006/0156120 | A1 | 7/2006 | Kim |
| 2008/0018640 | A1 | 1/2008 | Tada et al. |
| 2009/0195563 | A1 | 8/2009 | Xu et al. |
| 2010/0289779 | A1 | 11/2010 | Routley et al. |
| 2017/0011676 | A1 | 1/2017 | Wu |
| 2018/0330655 | A1 | 11/2018 | Tsuchi et al. |
| 2019/0035350 | A1 | 1/2019 | Miyata |
| 2019/0266962 | A1 | 8/2019 | Verbeure |
| 2020/0312232 | A1 | 10/2020 | Yen et al. |
| 2020/0312233 | A1 | 10/2020 | Yen et al. |

FOREIGN PATENT DOCUMENTS

| | | |
|---|---|---|
| JP | 2001-249636 | 9/2001 |
| JP | 2002-196308 | 7/2002 |
| JP | 2003-228317 | 8/2003 |
| JP | 2005-062382 | 3/2005 |
| JP | 2005-115271 | 4/2005 |
| JP | 2006-189855 | 7/2006 |
| JP | 2007-041017 | 2/2007 |
| JP | 2007-249247 | 9/2007 |
| JP | 2008-026395 | 2/2008 |
| JP | 2009-128414 | 6/2009 |
| JP | 2015-014700 | 1/2015 |
| JP | 2018-189942 | 11/2018 |
| JP | 2020-166265 | 10/2020 |
| JP | 2020-177228 | 10/2020 |
| JP | 2022-009635 | 1/2022 |

* cited by examiner

DISPLAY DRIVING CIRCUIT, DISPLAY DEVICE, ROAD SIGN BOARD, AND DRIVING METHOD FOR DISPLAY DEVICE

CROSS-REFERENCE TO RELATED APPLICATION

This application claims priority to Japanese Patent Application No.

2022-151621, filed on Sep. 22, 2022, the content of which is incorporated by reference in its entirety.

BACKGROUND

1. Technical Field

The present disclosure relates to a display driving circuit, a display device, a road sign board, and a driving method for a display device.

2. Background Art

A display device such as a road sign board or a display using a semiconductor light-emitting element such as a light-emitting diode (LED) or an organic electro-luminescent (EL) is driven to light up by a driving circuit. There has been a worldwide demand for reduction in consumption of fossil fuels due to concerns about climate change and the rise of sustainable development goals (SDGs) in recent years, and currently there is also a demand for reduction in electric power energy generated mainly by fossil fuels. Therefore, in addition to reduction in power consumption by the improvement of performance of the semiconductor light-emitting element, reduction in power consumption is also required for a driving circuit for controlling the semiconductor light-emitting element and the driving power for the display device itself needs to be reduced.

However, this is not easy. It is known that a display device using a semiconductor element requires a standby current for driving a switching circuit mounted for dynamic scan lighting. This standby current is referred to as dark current and needs to be supplied as power other than power for lighting a light-emitting element.

For example, in an LED display in the related art, a common driver circuit on an anode side of an LED including the above switching circuit is turned on in accordance with a maximum lighting period of a set displayable time. On the other hand, the time during which each LED is actually lit is controlled by data (gradation data or the like) transmitted from a control integrated circuit (IC) to a driver IC connected to a cathode side of the LED. In this configuration, dark current flowing through the common driver circuit flows intermittently even in a black display state of a minimum lighting period. In this way, a consumption current flowing through the common driver circuit requires a constant amount of supply from a power supply at all times at any luminance setting for the above maximum lighting period. Therefore, in a case in which the display device emits light at high luminance when the product of a driving current and a lighting period is increased during the above maximum lighting period, the proportion of power consumed by the dark current is decreased with respect to the total power, but there is a problem that the proportion of dark current to the total power is increased at low luminance when the product of the driving current and the lighting period is decreased. (See, e.g., JP 2008-026395 A and JP 2007-041017 A).

Thus, a display driving circuit, a display device, a road sign board, and a driving method for a display device is needed in which power consumption during driving is reduced.

SUMMARY OF INVENTION

A display driving circuit according to an aspect of the present disclosure is a display driving circuit for a display unit including a plurality of light-emitting elements connected along respective common lines and arranged in a matrix, and includes: one or more element drivers configured to drive the plurality of light-emitting elements of the display unit; a memory configured to store lighting period information indicating a lighting period in which each light-emitting element is lit by the one or more element drivers; an element lighting period controller configured to output the lighting period information stored in the memory to each element driver; a switching unit configured to select each common line based on the lighting period information stored in the memory; and a common line lighting period controller that is interposed between the memory and the switching unit and configured to control a lighting period in which each common line is activated according to the lighting period information.

A display device according to another aspect includes: a display unit including a plurality of light-emitting elements connected along respective common lines and arranged in a matrix; one or more element drivers configured to drive the plurality of light-emitting elements; a memory configured to store lighting period information indicating a lighting period in which each light-emitting element is lit by the one or more element drivers; an element lighting period controller configured to output the lighting period information stored in the memory to each element driver; a switching unit configured to select each common line based on the lighting period information stored in the memory; and a common line lighting period controller that is interposed between the memory and the switching unit and configured to control a lighting period in which each common line is activated according to the lighting period information.

A driving method for a display device according to further another aspect is a driving method of driving a display device including a display unit including a plurality of light-emitting elements connected along respective common lines and arranged in a matrix, one or more element drivers for driving the plurality of light-emitting elements, a memory that stores lighting period information indicating a lighting period in which each light-emitting element is lit by the one or more element drivers, an element lighting period controller that outputs the lighting period information stored in the memory to each element driver, and a switching unit that selects each common line based on the lighting period information stored in the memory, and includes: determining, by a common line lighting period controller interposed between the memory and the switching unit, a lighting period of each common line according to the lighting period information; and lighting each light-emitting element by driving the switching unit according to the lighting period in which each common line is activated determined by the common line lighting period controller.

In accordance with a display driving circuit, a display device, a road sign board, and a driving method for a display device according to the above aspects, the method of fixing the lighting period on the common line to the maximum lighting period as in related art is not employed, but the common line is activated (e.g., turned on) in accordance with the lighting period of an element driver that actually lights a light-emitting element, so that unnecessary driving of the light-emitting element can be suppressed and power consumption can be reduced. In particular, at the time of light emission at low luminance, the proportion of dark current is relatively high, and thus the dark current is suppressed and the power reduction effect is enhanced.

DESCRIPTION

Figure 1:
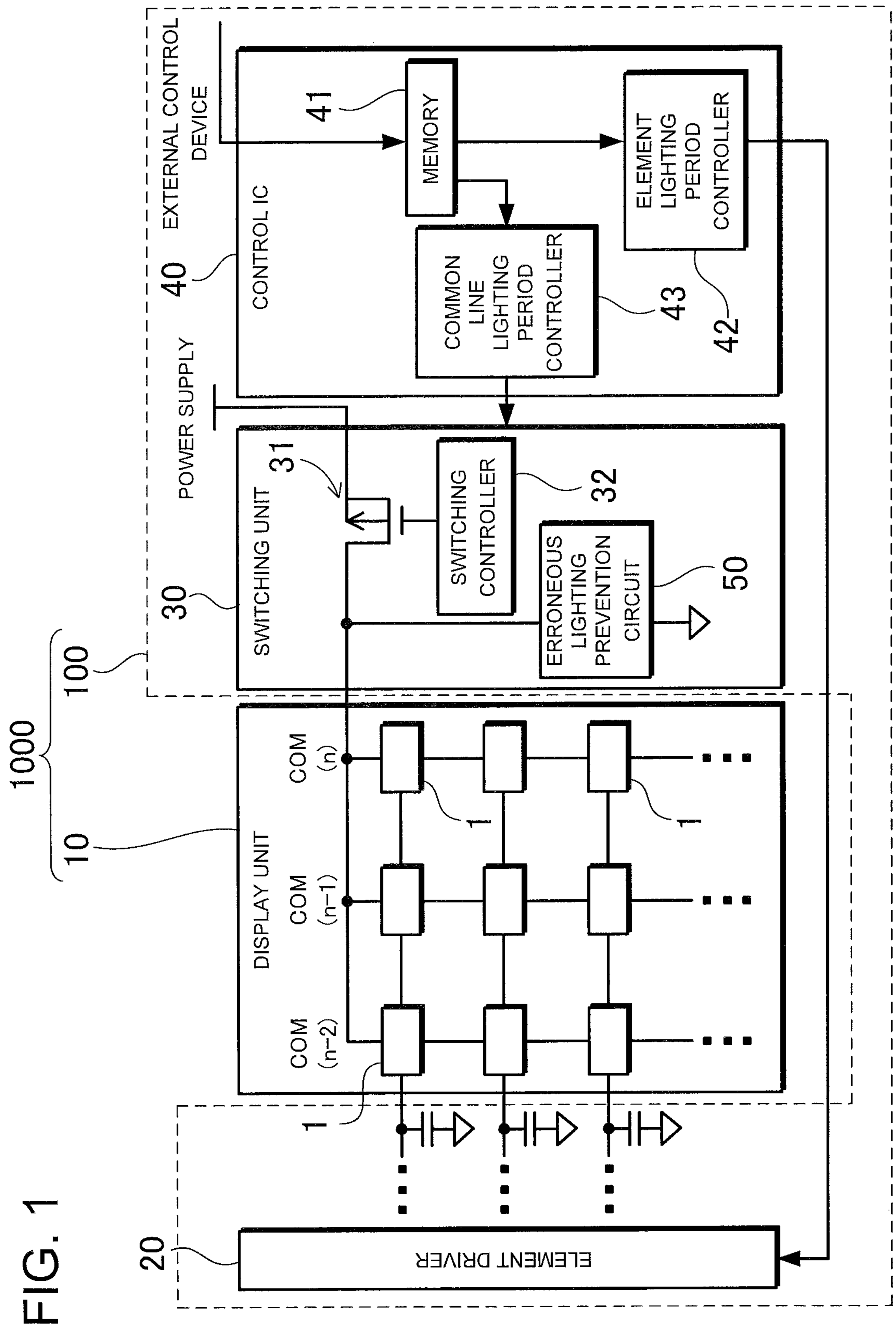
FIG. 1 is a block diagram illustrating a display device according to an embodiment of the present disclosure.

The present disclosure is described in detail below with reference to the drawings. In the following description, terms indicating specific directions and positions (for example, “upper”, “lower”, and other terms including these terms) are used as necessary; however, the use of these terms is to facilitate the understanding of the invention with reference to the drawings and the technical scope of the present disclosure is not limited by the meaning of these terms. Parts having the same reference signs appearing in a plurality of drawings indicate identical or equivalent parts or members.

The following embodiments show specific examples of the technical idea of the present disclosure, and the present disclosure is not limited to the following embodiments. Unless otherwise specified, the dimensions, materials, shapes, relative arrangements, and the like of constituent elements to be described below are not intended to limit the scope of the present disclosure only thereto, but rather to provide examples. The contents to be described in an embodiment and an example can be applied to another embodiment and another example. The size, positional relationship, and the like of the members illustrated in the drawings can be exaggerated in order to clarify the explanation.

FIRST EMBODIMENT

A display device according to the present disclosure can be suitably used for a device including a display screen such as a display board that displays character strings, figures, or the like, such as a road sign board or a railroad sign board. As an example, an application to a road sign board is described with reference to FIGS. 1 and 2.

Display Device 1000

Figure 2:
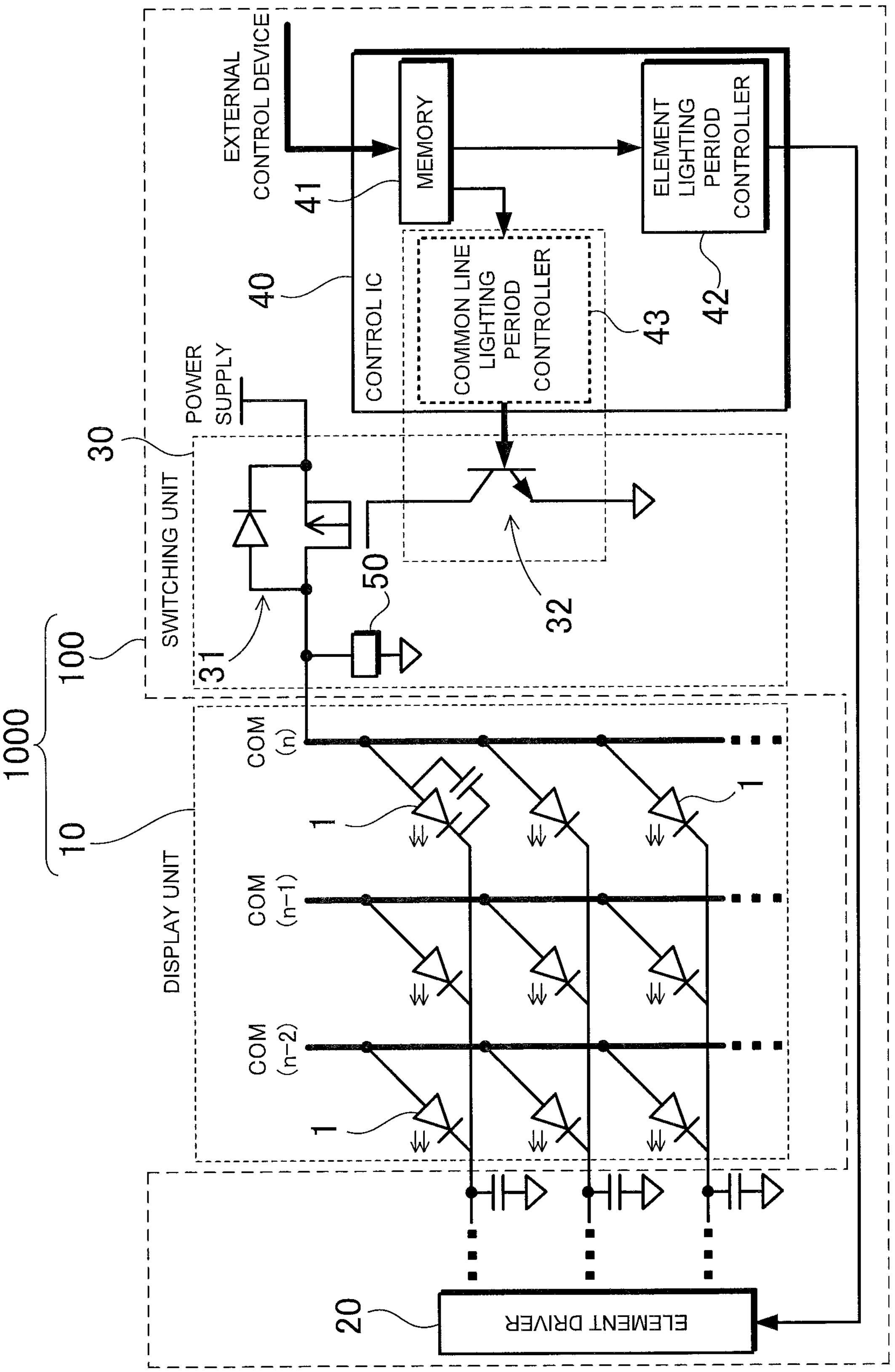
FIG. 2 is a circuit diagram illustrating the display device according to an embodiment of the present disclosure.

FIG. 1 is a block diagram of a display device 1000 according to a first embodiment, and FIG. 2 is an example of a circuit diagram thereof. The display device 1000 illustrated in FIGS. 1 and 2 includes a display unit 10 and a driving circuit 100.

Display Unit 10

The display unit 10 constitutes a display screen, and includes a plurality of light-emitting elements 1 connected along respective common lines and arranged in a matrix. A dot matrix display including the light-emitting elements 1 arranged at pixel positions can be used for such a display unit 10. A semiconductor light-emitting element such as an LED, an organic light-emitting diode (OLED), or a laser diode (LD) can be used for the light-emitting element 1. In the example in FIG. 2, LEDs are used for the light-emitting elements 1, and anode terminals of the LEDs are connected to common lines COM1, COM2, . . . , COMn-2, COMn-1, and COMn (vertical direction in the drawing) to form an anode common connection.

Display Driving Circuit 100

The driving circuit 100 drives the display unit 10 of the display device 1000. In the present disclosure, the driving circuit 100 may be referred to as a display driving circuit 100. The display driving circuit 100 includes one or more element drivers 20, a switching unit 30, a memory 41, an element lighting period controller 42, and a common line lighting period controller 43.

Element Driver 20

One or more element drivers 20 drive the plurality of light-emitting elements 1 of the display unit 10. The element driver 20 such as that described above is referred to as a segment driver, a signal driver, a sink driver, a constant current driver, a driver IC, or the like. FIGS. 1 and 2 illustrate one element driver 20; however, for example, when a display unit 10 that can perform full-color light emission is formed using red, green, and blue light-emitting elements 1R, 1G, and 1B as the light-emitting elements 1 disposed in respective pixels as illustrated in a light-emitting device 1000' in FIG. 10 to be described below, an element driver 20R for red connected to the red light-emitting element 1R, an element driver 20G for green connected to the green light-emitting element 1G, and an element driver 20B for blue connected to the blue light-emitting element 1B are used. Light-emitting elements of any two colors such as red and blue can be used. On the other hand, for the purpose of increasing the amount of light or the like, two light-emitting elements of a specific color, for example, two red light-emitting elements 1R can be used in each pixel. In this way, the element drivers 20 are prepared according to the number of light-emitting elements constituting each pixel of the display unit 10.

Each of the element drivers 20 includes output terminals for individually connecting source lines (horizontal direction in FIG. 2) to which cathode terminals of a plurality of LEDs of the display unit 10 are respectively connected. Each output terminal is grounded by connecting a constant current source and a switching element 31 to be described below in series to the source line. Thus, a sink current can be supplied to each LED. The element driver 20 such as that described above can preferably use a multi-channel constant current driver that individually drives each LED with a constant current sink current, or an element referred to as an LED driver IC or the like. The element driver 20 is simply referred to as a driver IC.

Switching Unit 30

The switching unit 30 is a member that is connected to the display unit 10, selects the light-emitting elements 1 of the display unit 10 by switching the common lines, and lights the selected light-emitting elements 1. The switching unit 30 is controlled to select common lines connected to the anode terminals of the light-emitting elements 1 by a dynamic scan method. The switching unit 30 such as that described above is also referred to as an address selection circuit, a common line selection circuit, a common line scan circuit, a common driver, or the like. The switching unit 30 in FIG. 2 and the like includes the switching element 31 and a switching controller 32.

Switching Element 31

The switching element 31 is provided for each common line of the display unit 10. FIG. 2 illustrates only the switching element 31 connected to the common line COMn for the sake of explanation, but actually, each switching element 31 is connected to a corresponding common line. Each switching element 31 selects a common line of an LED to be lit, on the basis of lighting period information stored in the memory 41. That is, a control IC 40 controls the switching element 31 connected to the common line of the LED to be lit such that the switching element 31 is turned on. The switching element 31 can be formed by a semiconductor element such as an FET. In the example in FIG. 2, a p-channel power metal-oxide-semiconductor field-effect transistor (MOSFET) is used for the switching element 31.

Switching Controller 32

The switching controller 32 controls ON/OFF of the switching element 31. Specifically, the switching controller 32 controls a lighting period in which each common line is activated. For example, a gate driving circuit connected to a gate electrode of a MOSFET serving as the switching element 31 can be used as the switching controller 32. In FIG. 2, a bipolar transistor is used as such a switching controller 32.

Control IC 40

The control IC 40 is a controller that is connected to the element driver 20 and the switching unit 30 and controls them. A signal for controlling the element driver 20 and the switching unit 30 is generated so that a signal to be transmitted to the display unit 10 is written to each pixel according to timing. Such a control IC 40 can be mainly formed by a counter circuit. The control IC 40 is connected to an external control device, receives a horizontal synchronizing signal and a vertical synchronizing signal of an input signal from the control device, identifies frequencies and resolutions of the respective signals, and performs various types of control of a dot clock for driving, start timing, stop timing, and alternating current (AC) drive switching timing of the element driver 20 and the switching unit 30, or the like.

In the example in FIG. 1, the memory 41, the element lighting period controller 42, and the common line lighting period controller 43 are incorporated in the control IC 40. However, the memory 41, the element lighting period controller 42, and the common line lighting period controller 43 can be formed by separate members. The control IC 40 can be provided for each light-emitting element 1 constituting the pixel of the display unit 10 like the element driver 20 and the switching unit 30, or can be configured to drive a plurality of element drivers and a switching unit by a common control IC.

Memory 41

The memory 41 is a member for storing lighting period information indicating a lighting period in which each light-emitting element 1 is lit by one or more element drivers 20. The memory 41 is connected to an external control device and rewrites the lighting period information. An electrically erasable programmable read-only memory ($E^2$PROM) or the like can be used for the memory 41 such as that described above. In the example in FIG. 1, the memory 41 is incorporated in the control IC 40; however, the present disclosure is not limited to this configuration and, for example, the memory can be an external member, or the memory can be incorporated in another member, for example, an element driver or the like.

Lighting Period Information

The lighting period information includes a timing and a period in which each light-emitting element 1 is lit. The lighting period information can also include gradation data. Thus, the emission luminance, brightness, dimming, and the like of the display unit 10 can be controlled.

Element Lighting Period Controller 42

The element lighting period controller 42 controls each element driver 20, instructs lighting/non-lighting of each light-emitting element 1, and controls a lighting period. The element lighting period controller 42 outputs the lighting period information stored in the memory 41 to each element driver 20.

Figure 3:
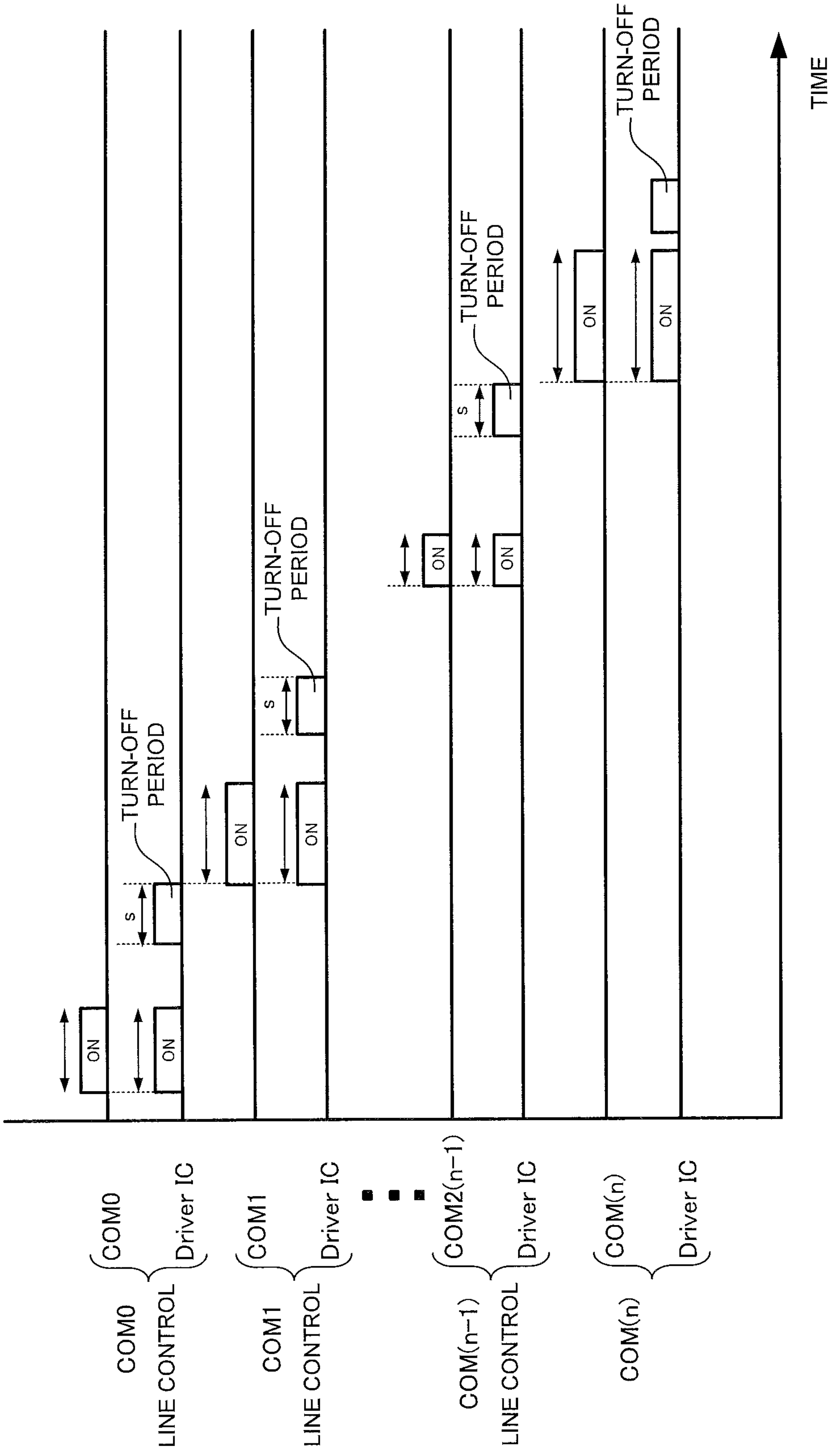
FIG. 3 is a timing chart showing a lighting pattern for lighting the display device in FIG. 2.

FIG. 3 is a timing chart showing the lighting periods of the light-emitting elements 1 connected to respective common lines. In FIG. 3, the ON period of the driver IC is controlled by the element lighting period controller 42. That is, in order to light and drive each light-emitting element 1, the common line lighting period controller 43 controls a common line ON period in which the common line is activated, while the element lighting period controller 42 controls a source line ON period in which the source line is activated.

With such a configuration, the method of fixing the lighting period on the common line to the maximum lighting period as in related art is not used, but the common line is turned on in accordance with the lighting period of an element driver 20 that actually lights a light-emitting element 1, so that unnecessary driving of the light-emitting element 1 can be stopped and power consumption can be reduced. In particular, at the time of light emission at low luminance, the proportion of dark current is relatively high, and thus the dark current is suppressed and the power reduction effect is enhanced (details will be described below).

Common Line Lighting Period Controller 43

The common line lighting period controller 43 controls the switching element 31 connected to each common line, and controls lighting, that is, ON/OFF of the light-emitting element 1 connected to the common line. The common line lighting period controller 43 further controls a lighting period during which the light-emitting element 1 connected to the common line is turned on. The common line lighting period controller 43 is interposed between the memory 41 and the switching element 31.

In the example illustrated in FIG. 2, the switching controller 32 is interposed between the common line lighting period controller 43 and the switching element 31. The switching controller 32 controls a lighting period in which each common line is activated according to the lighting period information by the common line lighting period controller 43. Specifically, the common line lighting period controller 43 can cause a lighting period in which the common line is activated to coincide with a lighting period during which one or more element drivers 20 light the light-emitting element 1. That is, the common line lighting period controller 43 adjusts, for each common line, an energization period, during which the common line is connected, so as to match a period during which the common line is connected to the source line. Thus, since no common line is activated during a non-lighting period, efficient lighting control with reduced wasteful power consumption can be obtained.

In the example in FIG. 2, the control IC 40 controls ON/OFF of the switching element 31 via the switching controller 32; however, the present disclosure is not limited to this configuration and, for example, the control IC 40 can be configured to directly control the ON/OFF of the switching element 31. In this case, the switching controller 32 can be omitted.

Figure 4:
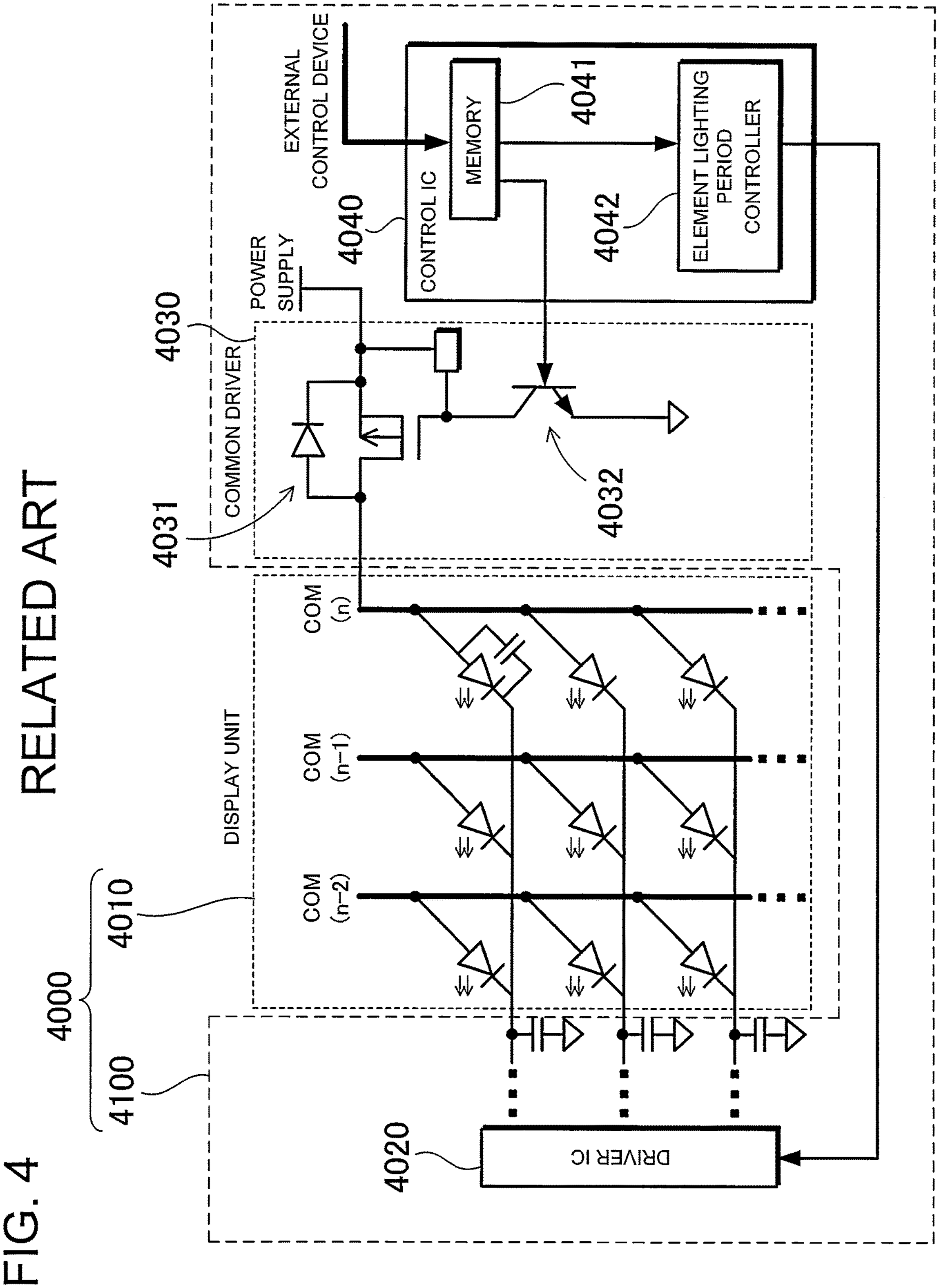
FIG. 4 RELATED ART
FIG. 4 is a circuit diagram illustrating a display device according to a first comparative example.
Figure 5:
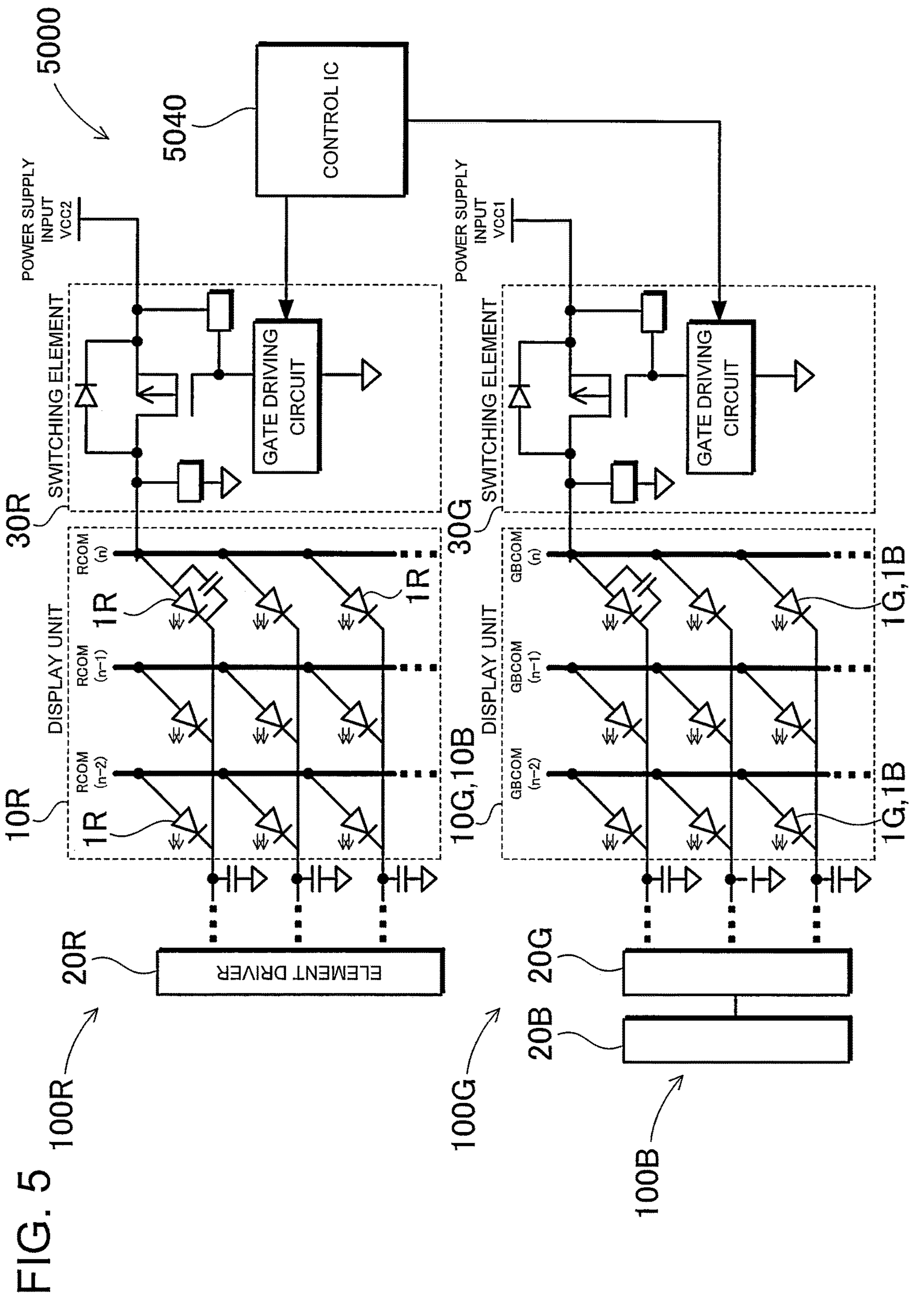
FIG. 5 RELATED ART
FIG. 5 is a circuit diagram illustrating a display device for lighting red, green, and blue LEDs according to a second comparative example.
Figure 6:
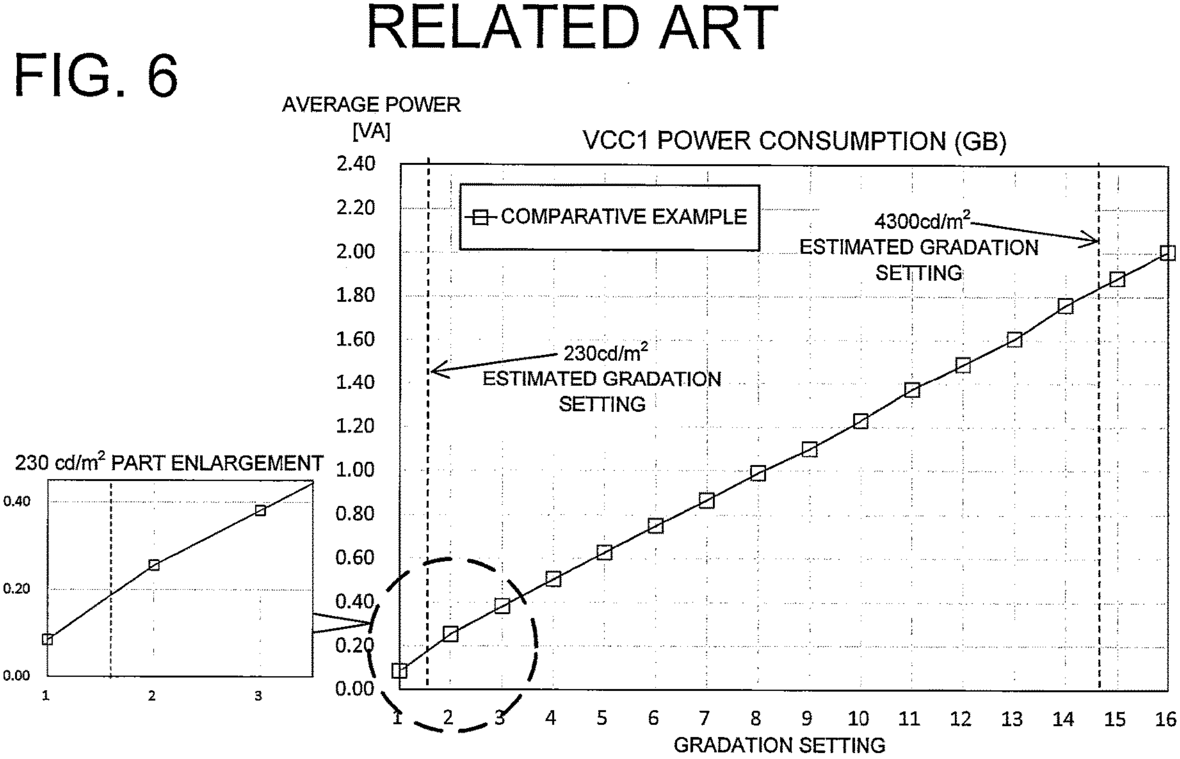
RELATED ART FIG. 6
FIG. 6 is a graph showing average power consumption for each gradation for lighting the green and blue LEDs in FIG. 5.
Figure 7:
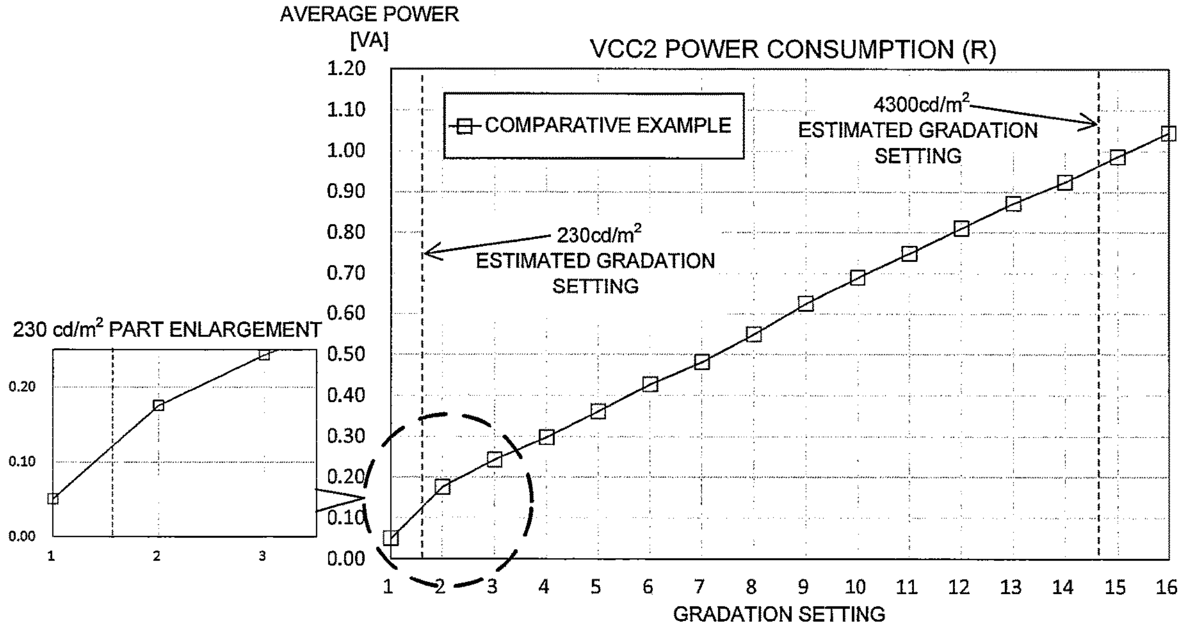
RELATED ART FIG. 7
FIG. 7 is a graph showing average power consumption for each gradation for lighting the red LED in FIG. 5.
Figure 8:
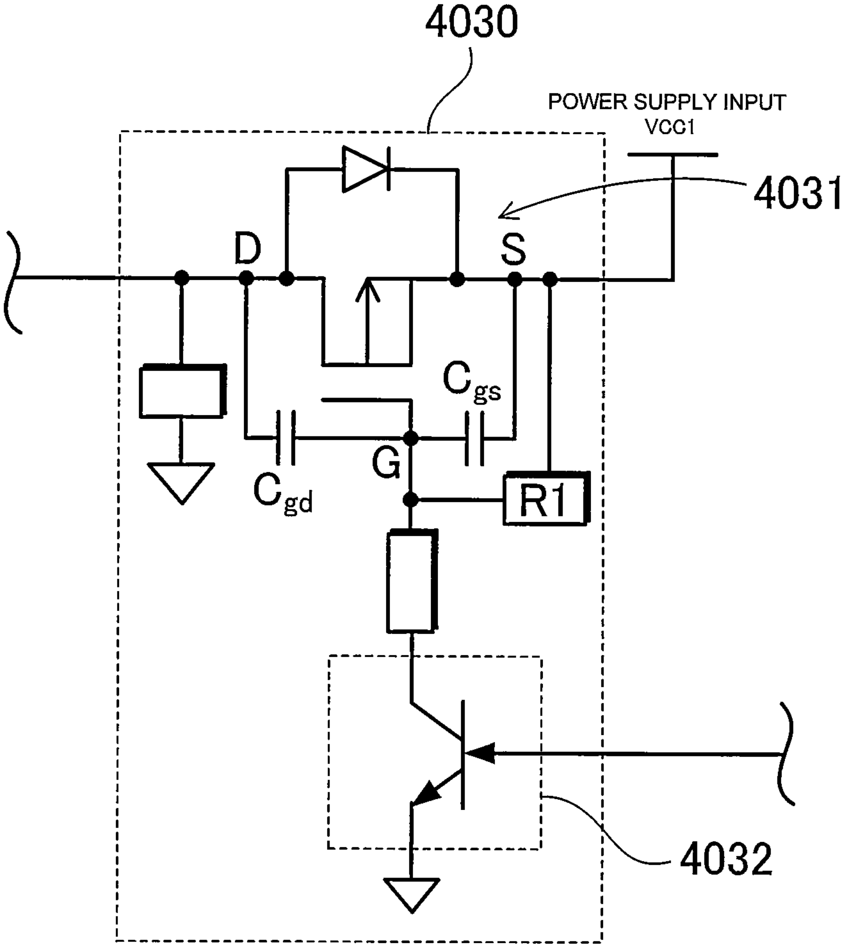
RELATED ART FIG. 8
FIG. 8 is an enlarged view of main components in FIG. 4.
Figure 9:
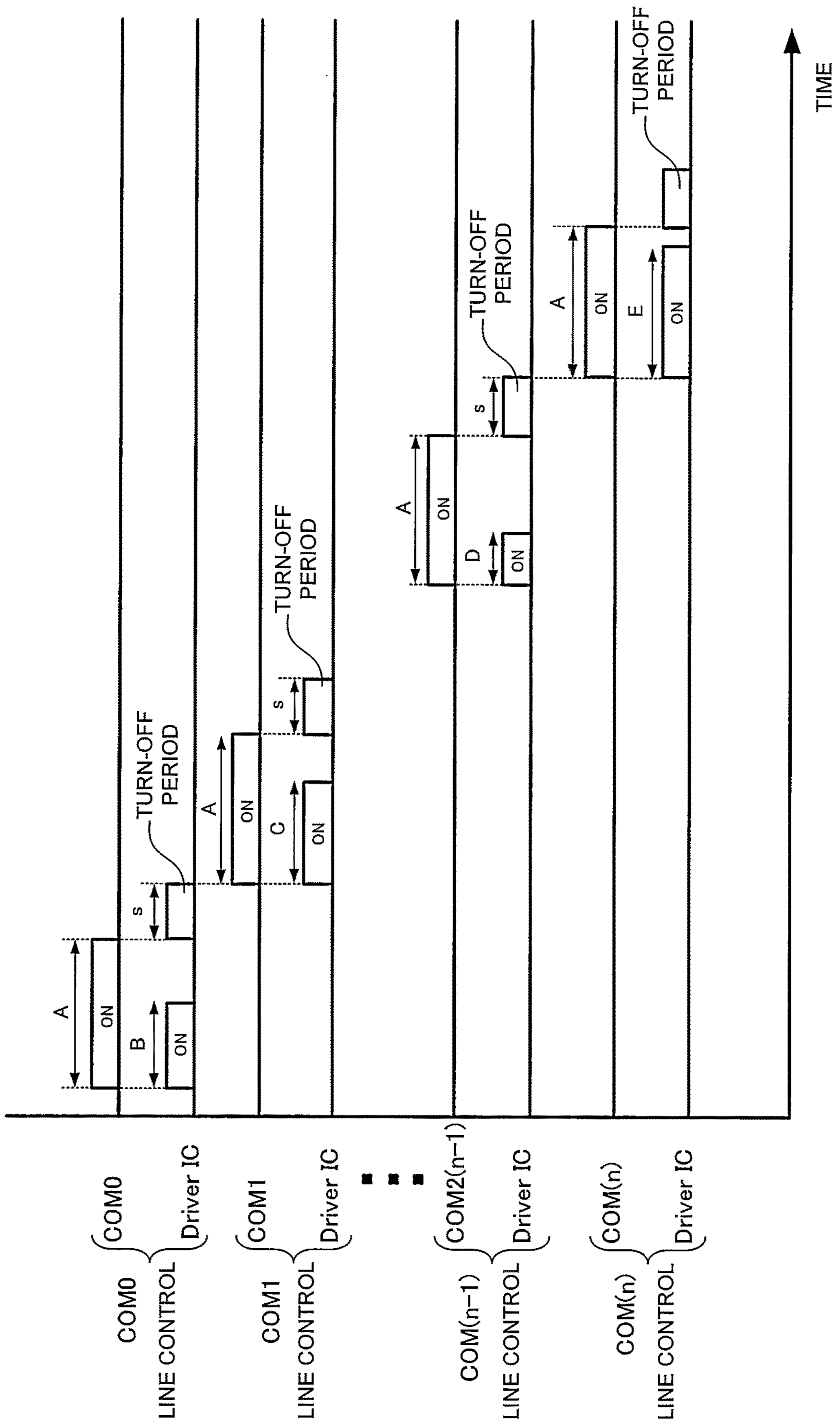
FIG. 9 RELATED ART
FIG. 9 is a timing chart showing a lighting pattern for lighting the display device in FIG. 4.

The element driver 20 can perform passive driving of lighting the plurality of light-emitting elements 1 by switching between the common lines. The common line lighting period controller 43 reads in advance, from the memory 41, the lighting period of each light-emitting element 1 connected to a common line to be selected by the element driver 20, thereby controlling a lighting period during which the common line is activated when one or more element drivers 20 select the common line. By such pre-reading control, the lighting period of each light-emitting element 1 can be smoothly controlled. Pre-reading of data from the memory is not essential, and other lighting data or the like can be read first. This is described in detail below with reference to FIGS. 4 to 9. FIG. 4 is a circuit diagram illustrating a display device according to a first comparative example, FIG. 5 is a circuit diagram illustrating a display device for lighting red, green, and blue LEDs according to a second comparative example, FIG. 6 is a graph showing average power consumption for each gradation for lighting the green and blue LEDs in FIG. 5, FIG. 7 is a graph showing average power consumption for each gradation for lighting the red LED in FIG. 5, FIG. 8 is an enlarged view of a main part in FIG. 4, and FIG. 9 is a timing chart showing a lighting pattern for lighting the display device in FIG. 4.

FIRST AND SECOND COMPARATIVE EXAMPLES

A display device 4000 according to the comparative example illustrated in FIG. 4 includes a display unit 4010 and a driving circuit 4100. The driving circuit 4100 includes a driver IC 4020, a memory 4041, an element lighting period controller 4042, a common driver 4030, and a control IC 4040. The common driver 4030 includes a switching element 4031 and a switching controller 4032. However, unlike FIG. 2 and the like, the driving circuit 4100 includes no common line lighting period controller.

Light-emitting elements 1 such as LEDs of the display unit 4010 are connected in a grid pattern by common lines and source lines. Intersections in the grid pattern correspond to pixels of the display unit 4010. The common line and the source line are switched by the common driver 4030 and the driver IC 4020 to select an LED to be lit, and dynamic scan lighting is performed in a passive manner.

In the display unit 4010, LEDs with different emission colors can be arranged for each pixel so that emission colors are changed to different emission colors. In the example in FIG. 5, there is illustrated a display device 5000 that can perform full-color display in which a red LED 1R, a green LED 1G, and a blue LED 1B are arranged for each pixel of display units 10R and 10G. In FIG. 5, in order to clearly illustrate the drive control of the LEDs of the respective emission colors, an upper part illustrates a driving circuit 100R for the red LED 1R, and a lower part illustrates driving circuits 100G and 100B for the green LED 1G and the blue LED 1B. In general, since the red LED 1R is lit before and after 2 V and the green LED 1G and the blue LED 1B are lit before and after 3.5 V, the green LED 1G and the blue LED 1B having similar forward voltages are collectively illustrated. Actually, in the display unit 10, the red LED 1R, the green LED 1G, and the blue LED 1B are arranged close to one another for each pixel. In the example in FIG. 5, a common control IC 5040 controls a first switching unit 30R, a second switching unit 30G, and a third switching unit 30B.

FIG. 6 illustrates average power consumption Vcc1 for each gradation of the green LED 1G and the blue LED 1B and FIG. 7 illustrates average power consumption Vcc2 for each gradation of the red LED 1R in the display device 5000 in FIG. 5. In each of FIGS. 6 and 7, the average power consumption in the vicinity of gradation setting 1 is illustrated in an enlarged manner. As illustrated in FIGS. 6 and 7, in the display device according to the comparative example, it is understood that power consumption occurs even in a state in which no LEDs are lit (about 0.09 VA for the green LED 1G and the blue LED 1B illustrated in FIG. 6, and about 0.05 VA for the red LED 1R illustrated in FIG. 7). This is power consumption mainly by the common driver 4030 due to a standby current referred to as dark current, and is present in a constant amount at any luminance setting.

As a result, when the display device 5000 is lit at high luminance, for example, the proportion of the high luminance to the total power consumption is small in the daytime, so it is not noticeable. However, the lower the luminance, the greater the proportion of dark current to the total power, for example, during lighting in the nighttime.

On the other hand, in recent years, there has been a strong demand for a reduction in power consumption. In particular, due to concerns about climate change, at a summit meeting on climate change held in April 2021 under the leadership of the U.S. Government, Japan announced a 46% reduction compared to 2013 and the United States of America announced a 50% to 52% reduction compared to 2005, and in order to suppress consumption of fossil fuels and reduce CO2 emissions, reduction in power consumption is required in various fields. For example, in the field of road information display boards, the standards of the Ministry of Land, Infrastructure, Transport and Tourism require a front luminance (during white lighting) of 4300 cd/$m^2$ in the daytime and 230 cd/$m^2$ in the nighttime (during white lighting). In the above, reduction of the power consumption in the daytime is relatively easy to achieve by reducing overall power consumption, but increasing the power consumption reduction proportion in the nighttime is not easy because the amount of power consumption itself is originally low.

As a result of intensive research, the present inventor has come to believe that power consumption can be reduced by reducing dark current, and that the power consumption reduction proportion can be improved by suppressing dark current particularly in an operation in the nighttime when luminance is low, and has developed the lighting driving method of the display device according to the present embodiment. A detailed description is given below.

As illustrated in FIG. 8, which is an enlarged view of main components in FIG. 4, in an existing driving circuit, a MOSFET is used for the switching element 4031 for switching a common line. Assuming that the gate-drain parasitic capacitance of the MOSFET is Cgd and the gate-source parasitic capacitance is Cgs, the gate input capacitance Ciss of the MOSFET is Cgd+Cgs. When the common line is switched by the MOSFET, the gate input capacitance Ciss of the MOSFET needs to be charged and discharged, and the charge and discharge time affects a switching speed. The switching speed depends on the magnitude of a gate-source resistance value R1. That is, when the resistance value R1 increases, the dark current decreases, but the switching speed decreases. On the other hand, there is a trade-off relationship in which, when the resistance value R1 decreases, the dark current increases, but the switching speed increases. Therefore, when the power consumption is intended to be suppressed by reducing the dark current, the switching speed decreases, which is not preferable.

On the other hand, FIG. 9 illustrates a timing chart for controlling the lighting of each light-emitting element 1 in the display device 4000 in FIG. 4. As illustrated in FIG. 9, in the related art, even when the display unit 4010 is turned off for black display or for low luminance display, each common driver 4030 performs an ON operation in an ON period (indicated by A in FIG. 9) at the time of high luminance display (at the time of maximum lighting), and each common line is turned on in a time division manner in order to perform dynamic lighting (periods indicated by B, C, D, E and the like in FIG. 9).

Note that a turn-off period is provided at the time of transition in which each common line is switched, and this is a period necessary for switching of the MOSFET. When the turn-off period is long, the maximum lighting period is shortened and the lighting rate (lighting period per unit time) is reduced, so the current setting needs to be increased accordingly.

In this way, in the LED display in the related art, the common driver 4030 for switching the anode side of the LED is turned on in accordance with a maximum displayable lighting period. On the other hand, the actual lighting time of each LED is controlled only by data (gradation data or the like) transmitted from the control IC 4040 to the driver IC 4020 connected to the cathode side of the LED. In this configuration, dark current consumed by the common driver 4030 on the anode side continues to flow during the maximum lighting period even in the black display state or the low luminance display state.

Accordingly, in the display device 1000 according to the present first embodiment, as shown in the timing chart in FIG. 3, the switching unit 30 for switching the common line side is controlled to be turned on in accordance with the lighting period in which the light-emitting element 1 is actually lit. Therefore, as illustrated in FIG. 2 and the like, the common line lighting period controller 43 is added to the control IC 40. Thus, the lighting period of each LED connected to each common line can be set to the maximum lighting period among the lighting periods. This configuration allows dark current to flow in each common line for the required amount of time. As a result, it is possible to obtain an advantage that the effect on low power consumption becomes very large at the time of low luminance when the proportion of dark current is increased.

In order to perform such control, the control IC 40 stores in advance data indicating the lighting period, that is, the lighting period information in the memory 41. The lighting period information includes all data related to control of the lighting period, such as gradation data and a division function of a lighting control clock. On the basis of the lighting period information, the control IC 40 calculates in advance the maximum lighting period of an LED connected to each common line. This calculation can be performed by, for example, the common line lighting period controller 43 of the control IC 40. A dedicated application-specific integrated circuit (ASIC) or the like can also be used to calculate the maximum lighting period.

MODIFIED EXAMPLE

Figure 10:
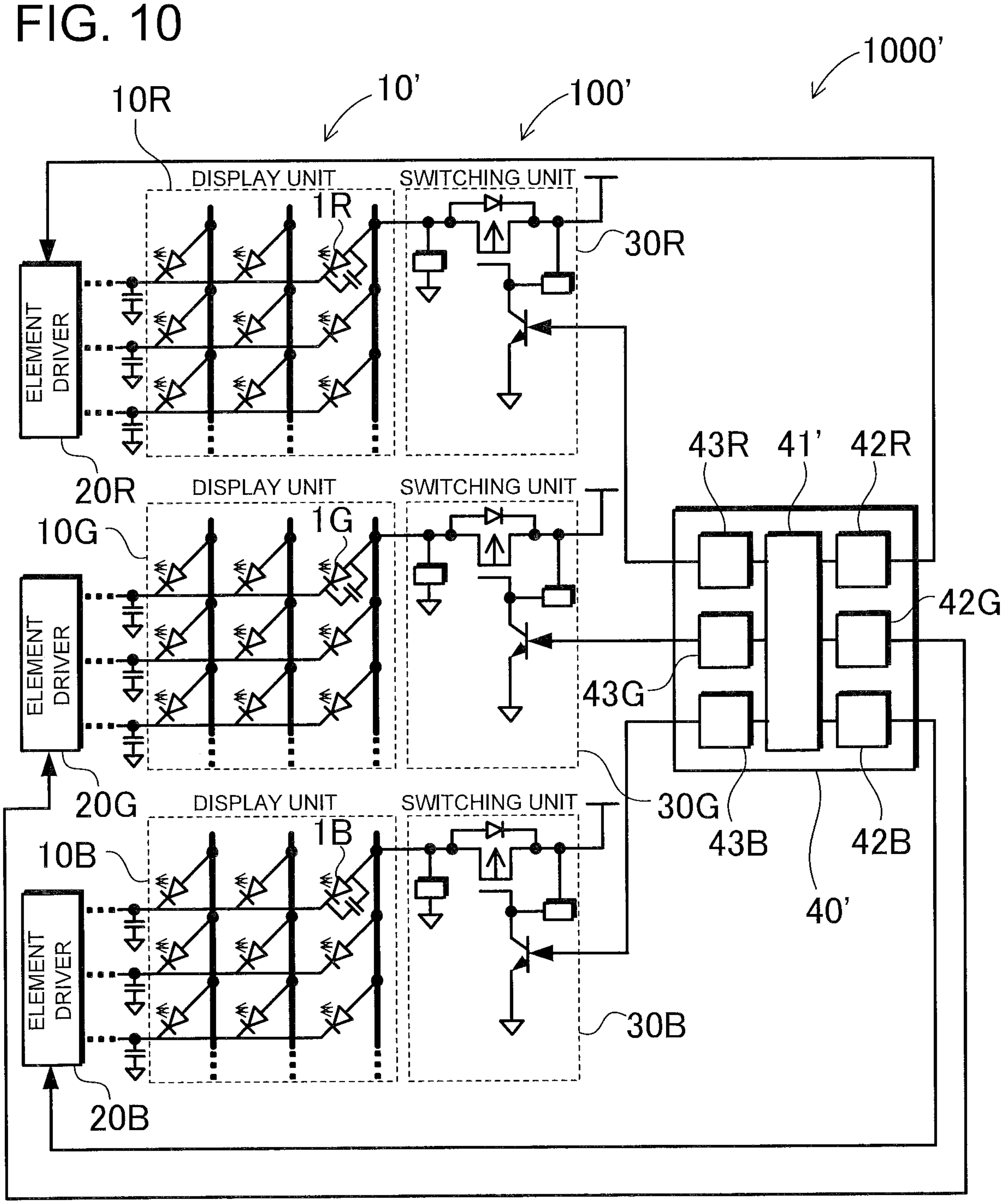
FIG. 10 is a circuit diagram illustrating a display device according to a modified example.

As described above, a plurality of element drivers 20 can be prepared for each of the light-emitting elements 1 having different emission colors. For example, as the element driver 20, a first element driver 20R for first light-emitting elements 1R and a second element driver 20G for second light-emitting elements 1G can be separately prepared, or a third element driver 20B for third light-emitting elements 1B can be additionally prepared. Such an example is illustrated in FIG. 10 as a display device 1000' according to a modified example. In FIG. 10, the same members as those of the above-described display device 1000 illustrated in FIGS. 1 and 2 are denoted by the same reference signs, and detailed description thereof is omitted. The display device 1000' illustrated in FIG. 10 includes a display unit 10' and a driving circuit 100'. The display unit 10' includes first light-emitting elements 1R each having a first emission color, second light-emitting elements 1G each having a second emission color different from the first emission color, and third light-emitting elements 1B each having a third emission color different from the first emission color and the second emission color. For the sake of explanation, FIG. 10 separately illustrates a display unit 10R including the first light-emitting elements 1R, a display unit 10G including the second light-emitting elements 1G, and a display unit 10B including the third light-emitting elements 1B; however, actually, the first light-emitting elements 1R, the second light-emitting elements 1G, and the third light-emitting elements 1B are arranged adjacent to one another for each pixel of the display unit 10'.

The driving circuit 100' includes the first element driver 20R, a first switching unit 30R, the second element driver 20G, a second switching unit 30G, the third element driver 20B, a third switching unit 30B, and a control IC 40'.

The first element driver 20R and the first switching unit 30R drive the first light-emitting elements 1R. Specifically, the first element driver 20R is connected to a source line and the first switching unit 30R is connected to a common line. The first element driver 20R and the first switching unit 30R are controlled by a first element lighting period controller 42R and a first common line lighting period controller 43R of the control IC 40'.

On the other hand, the second element driver 20G and the second switching unit 30G drive the second light-emitting elements 1G. Specifically, the second element driver 20G is connected to the source line and the second switching unit 30G is connected to the common line. The second element driver 20G and the second switching unit 30G are also controlled by a second element lighting period controller 42G and a second common line lighting period controller 43G of the control IC 40'.

On the other hand, the third element driver 20B and the third switching unit 30B drive the third light-emitting elements 1B. Specifically, the third element driver 20B is connected to the source line and the third switching unit 30B is connected to the common line. The third element driver 20B and the third switching unit 30B are also controlled by a third element lighting period controller 42B and a third common line lighting period controller 43B of the control IC 40'. In this way, the control IC 40' controls the lighting of the first light-emitting elements 1R, the second light-emitting elements 1G, and the third light-emitting elements 1B based on the lighting period information stored in a memory 41'.

The display device 1000' illustrated in FIG. 10 is configured to drive the first light-emitting elements 1R, the second light-emitting elements 1G, and the third light-emitting elements 1B by the common control IC 40'; however, the present disclosure is not limited to this configuration and for example, a first control IC that controls the lighting and driving of the first light-emitting elements, a second control IC that controls the lighting and driving of the second light-emitting elements, and a third control IC that controls the lighting and driving of the third light-emitting elements can be separately prepared. In contrast, the first element driver, the second element driver, and the third element driver can be integrated into a common element driver.

Moreover, in the example in FIG. 2 and the like, the element driver 20 for switching the source line and the switching unit 30 for switching the common line are formed as separate members; however, the present disclosure is not limited to this configuration and for example, the element driver and the switching unit can be configured as one member. Similarly, the memory 41, the element lighting period controller 42, and the common line lighting period controller 43 constituting the control IC can be integrated into the element driver or the switching unit.

Erroneous Lighting Prevention Circuit 50

The display device and the driving circuit can include an erroneous lighting prevention circuit 50. The erroneous lighting prevention circuit 50 is a circuit for suppressing erroneous lighting of the plurality of light-emitting elements. Specifically, the erroneous lighting prevention circuit 50 discharges a parasitic capacitance of an LED in order to suppress unintended erroneous lighting of the LED caused by the discharge of an electric charge accumulated in the parasitic capacitance, or a phenomenon called pseudo lighting or ghost. The erroneous lighting prevention circuit 50 can be incorporated in the switching unit 30, for example, and can be connected to the switching element 31.

Figure 11:
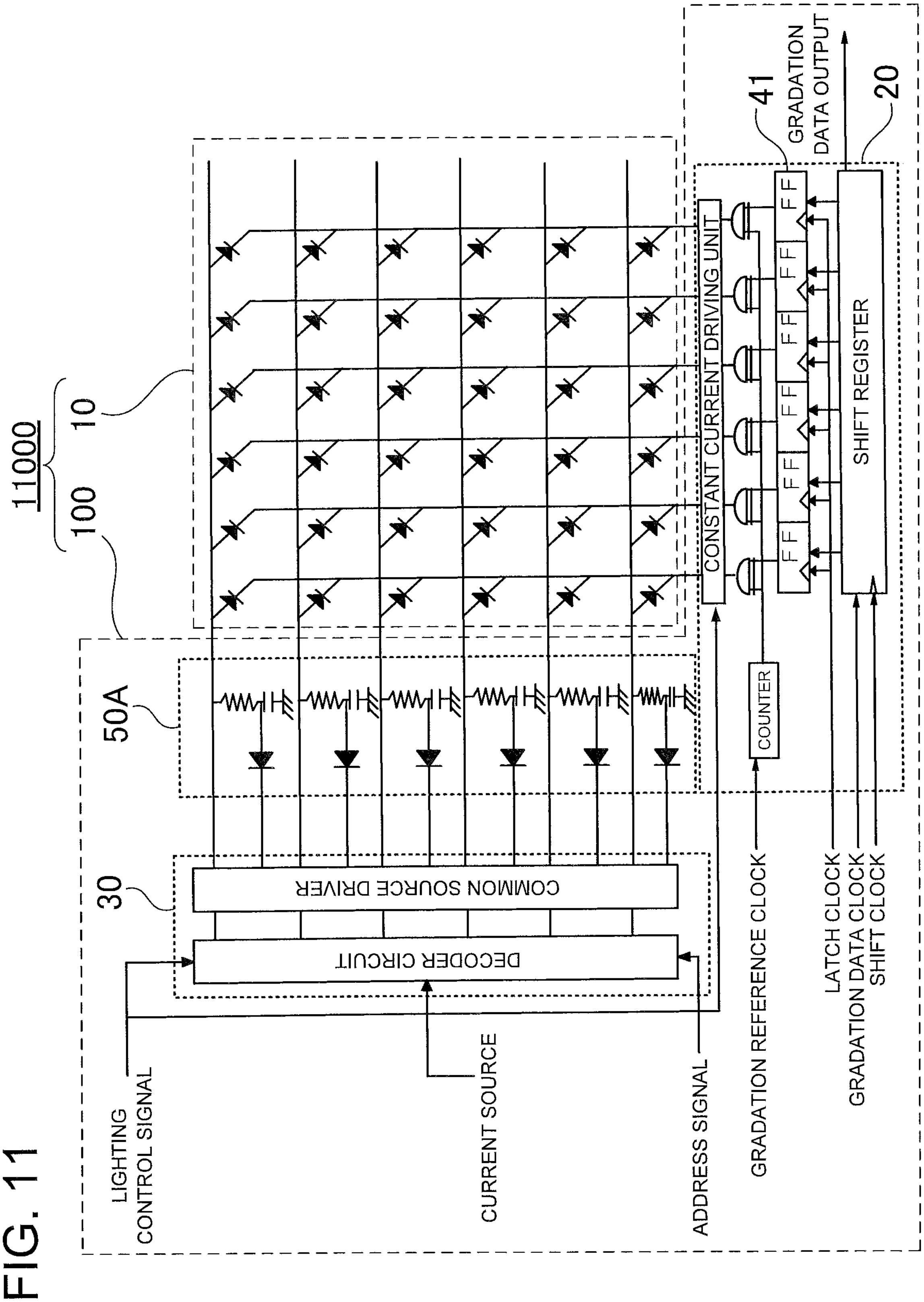
FIG. 11 is a circuit diagram illustrating an example of a display device including an erroneous lighting prevention circuit.
Figure 12:
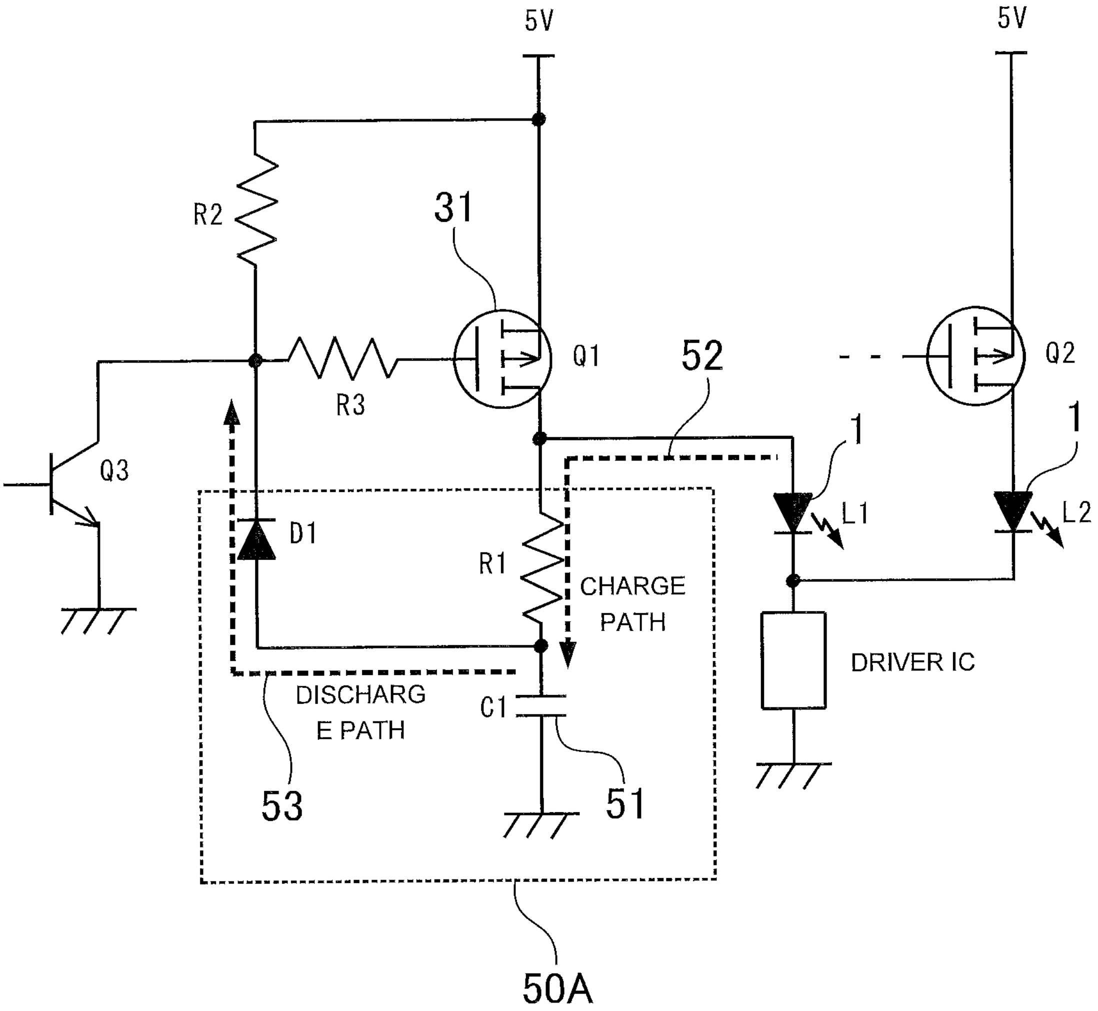
FIG. 12 is a circuit diagram illustrating an example of an erroneous lighting prevention circuit.

An example of the erroneous lighting prevention circuit 50 is illustrated in FIGS. 11 and 12. A display device 11000 illustrated in FIG. 11 includes an erroneous lighting prevention circuit 50A. The display device 11000 can be a road information display board or an LED display. The display device 11000 includes a display unit 10 and a driving circuit 100. In the display unit 10, a plurality of light-emitting elements 1 are arranged in a matrix of m rows and n columns, cathode terminals of the light-emitting elements 1 arranged in each column are connected to source lines provided for each column, and anode terminals of the light-emitting elements 1 arranged in each row are connected to common lines provided for each row.

The light-emitting element 1 is a light-emitting diode or a laser diode. A driving state and a non-driving state of the driving circuit 100 are controlled by the plurality of light-emitting elements 1 connected to the source line and an input lighting control signal. On the basis of display data input in each driving state, the energization of each common line is controlled.

The driving circuit 100 includes the erroneous lighting prevention circuit 50A. The erroneous lighting prevention circuit 50A includes a charge path 52, which is connected to an anode terminal of each light-emitting element 1 and the driving circuit 100 to charge a charging element 51 with residual charge in a non-driving state, the residual charge being generated on the anode terminal side of the light-emitting element 1 when shifting from a driving state to the non-driving state, and a discharge path 53 that is connected to the charge path 52 to discharge the residual charge from the charging element 51 to a ground terminal in the driving state. The discharge path 53 is a path that is connected to the charge path 52 and reaches the ground terminal via the driving circuit 100.

The driving circuit 100 further includes switching units 30 and memorys 41. The switching units 30 include m switching units 30 connected to common lines, respectively. The switching unit 30 connects a common line designated by an address signal input in the driving state to a constant current source.

The memory 41 stores n pieces of gradation data of display data that are sequentially input. In the example in FIG. 11, the memory 41 is included in the element driver 20. In the driving state of the light-emitting element 1, the element driver 20 brings a corresponding source line into an activated state with a gradation width corresponding to the gradation data stored in each memory 41.

The charge path 52 is a path including the charging element 51 having one end connected to the anode terminal side of each light-emitting element 1 and the other end grounded. The charge path 52 can include at least one resistor.

The discharge path 53 can include a rectifier. The anode terminal of the rectifier can be connected to the charging element 51 or the charge path 52, and the cathode terminal thereof can be connected in a direction of a ground terminal.

The charging element 51 can be a capacitor. Moreover, the rectifier can be a diode.

In a driving method for the display device 11000 for preventing erroneous lighting by using such the erroneous lighting prevention circuit 50A such as that described above, a driving state and a non-driving state are first controlled by a lighting control signal for controlling a lighting state and a non-lighting state. On the basis of display data input in the driving state, energization of one end of each common line and energization of one end of each source line are controlled. Moreover, residual charge generated on the anode terminal side of the light-emitting element 1 when shifting from the driving state to the non-driving state is charged to the charging element 51 in the non-driving state by the charge path 52 connected to the anode terminal of each light-emitting element 1 and the driving circuit 100. Subsequently, the residual charge is discharged from the charging element 51 in the driving state by the discharge path 53 connected to the charge path 52 and reaching the ground terminal.

Figure 13:
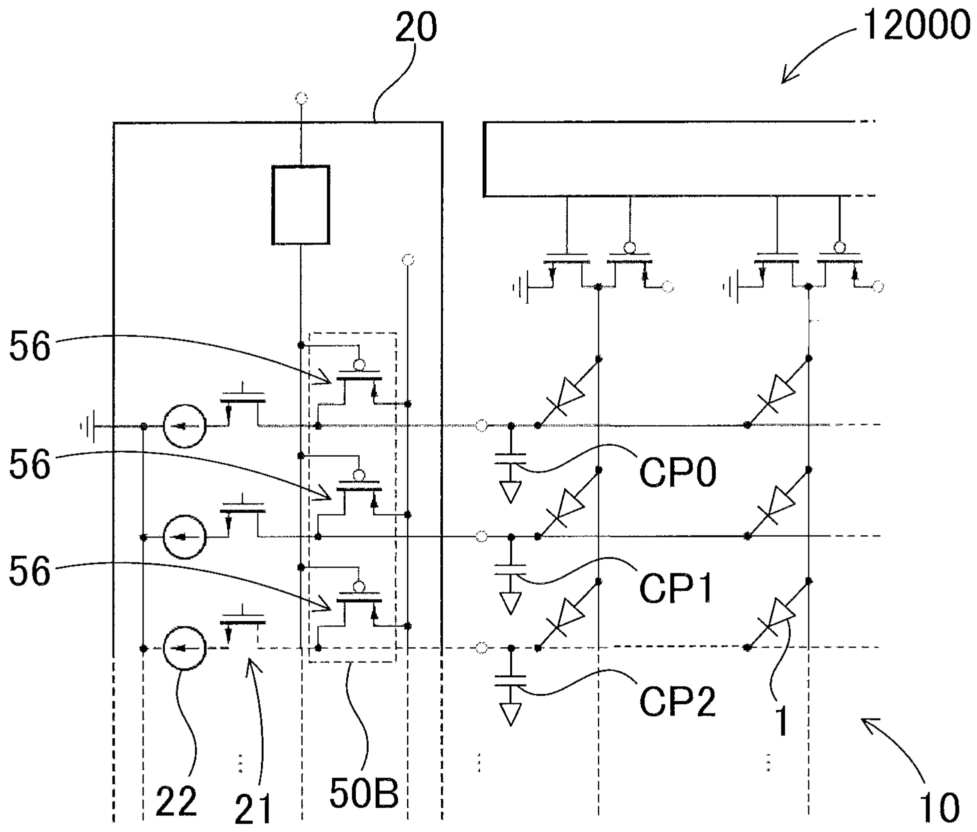
FIG. 13 is a circuit diagram illustrating another example of an erroneous lighting prevention circuit.

The erroneous lighting prevention circuit is not limited to the above example, and other known configurations can be appropriately employed. For example, the erroneous lighting prevention circuit 50 can be embedded in the element driver 20. As an example, in a display device 12000 illustrated in FIG. 13, an erroneous lighting prevention circuit 50B is incorporated in the element driver 20. A pre-charge FET 56 is connected to each source line of the display unit 10. In the example in FIG. 13, the pre-charge FET 56 is connected between an output terminal of the element driver 20 and a constant current source 22 or a switch 21. Each source line is connected in series to the switch 21 and the constant current source 22 and grounded. The pre-charge FET 56 prevents erroneous lighting of the light-emitting elements 1. The phenomenon of erroneous lighting refers to a charging current charged to the output terminal of the element driver 20 via the light-emitting element 1 or parasitic capacitances of a printed wiring board connected to the output terminal. In FIG. 13, such parasitic capacitances are virtually indicated by CP0, CP1, and CP2.

Some units constituting the display unit 10 or the driving circuit 100 can have Global Brightness Control information for adjusting a lighting period of an entire unit. The memory 41 can also be allowed to have such Global Brightness Control information. As an example, the lighting period of each LED can be determined according to gradation data, the lighting period of the entire unit can be determined according to Global Brightness Control data, and the actual lighting period of each LED can be finally determined by the gradation data×the Global Brightness Control data. In this way, the actual lighting period of each LED can be determined according to the Global Brightness Control data and the gradation data. In this way, when the unit side has a function of providing Global Brightness Control information, a common line can be turned on in accordance with the lighting period of a sink driver of the present embodiment by using this function, so that power consumption can be reduced.

Driving Method for Display Device

An example of a driving method for the display device is described below with reference to FIG. 2. The display device 1000 includes the display unit 10, the element driver 20, the switching unit 30, the memory 41, and the element lighting period controller 42. In the display unit 10, a plurality of light-emitting elements connected along respective common lines are arranged in a matrix. The memory 41 stores lighting period information indicating a lighting period in which each light-emitting element is lit by one or more element drivers 20. The element drivers 20 drive the plurality of light-emitting elements. The element lighting period controller 42 outputs the lighting period information stored in the memory 41 to each element driver 20. The switching unit 30 selects each common line based on the lighting period information stored in the memory 41.

First, the common line lighting period controller 43 pre-reads the memory 41 and determines a lighting period in which each common line is activated according to the lighting period information. Subsequently, each light-emitting element is lit by driving the switching unit 30 according to the lighting period in which each common line is activated determined by the common line lighting period controller 43. Thus, the method of fixing the lighting period on the common line to the maximum lighting period as in related art is not used, but the common line is turned on in accordance with the lighting period of an element driver 20 that actually lights a light-emitting element 1, so that unnecessary driving of the light-emitting element can be suppressed and power consumption can be reduced. In particular, at the time of light emission at low luminance, the proportion of dark current is relatively high, and thus the dark current is suppressed and the power reduction effect is enhanced.

FIRST EXAMPLE AND THIRD COMPARATIVE EXAMPLE

Next, display driving circuits and display devices according to a first example and a third comparative example were actually prepared, power consumption was measured, and their effectiveness was confirmed. Both the first example and the third comparative example used an LED unit model number NLU2F872D8 (Lot number: 21BZN, Serial number: 0004) which is a display driving circuit manufactured by Nichia Corporation. Both the first example and the third comparative example used a display that can perform full-color display using a red LED, a green LED, and a blue LED for each pixel of a display unit.

First, lighting period information was input as display data to the LED unit from an external control device. The input lighting period information data was stored in the memory 41 in the LED unit. Subsequently, the stored display data was transferred to an element driver which is a driver IC. On the basis of the display data, a maximum lighting period for each common line was calculated by the external control device. Subsequently, a minimum required ON time of a common driver was set in accordance with the calculated maximum lighting period, the LED unit was driven based on this setting, and power consumption was measured. For the measurement of the power consumption, all the LEDs were lit by adjusting each luminance to be variable by using an oscilloscope DPO3054, a current probe TCP312, and a current probe amplifier TCPA300 manufactured by Tektronix Corporation and Fluke Co., Ltd under the conditions that an ambient temperature is 25° C., an applied voltage is typ condition in display unit specifications, one lighting cycle is 258 μS, and RGB gradations: chromaticity coordinates (x, y)=(0.3, 0.3), an average current and an average voltage in one lighting cycle (at the time of lighting one arbitrary scanning line) of a display unit input part at this time were measured, and average power [VA] was calculated from the product thereof. In this experiment, a control IC was designed so that the lighting period of each common line can be set from the external control device in advance in order to confirm the effect, but in an actual display device or the like, since the common line lighting period controller 43 can calculate and control power consumption based on all data related to the lighting period such as input gradation data, adding a function controllable by the external control device is not always necessary.

The results of this experiment are shown in the following Tables 1 to 3 and FIGS. 14 to 19. In these Tables, Table 1 shows the average power [VA] for each gradation of the green LED and the blue LED, Table 2 shows the average power [VA] for each gradation of the red LED, and Table 3 shows the average power [VA] for each gradation of all the red, green, and blue LEDs. In each table, the gradation setting 1 indicates a turn-off state. The gradation setting 1.6 indicates a nighttime standard for lighting in the nighttime, and the gradation setting 14.5 indicates a daytime standard for lighting in the daytime.

Figure 14:
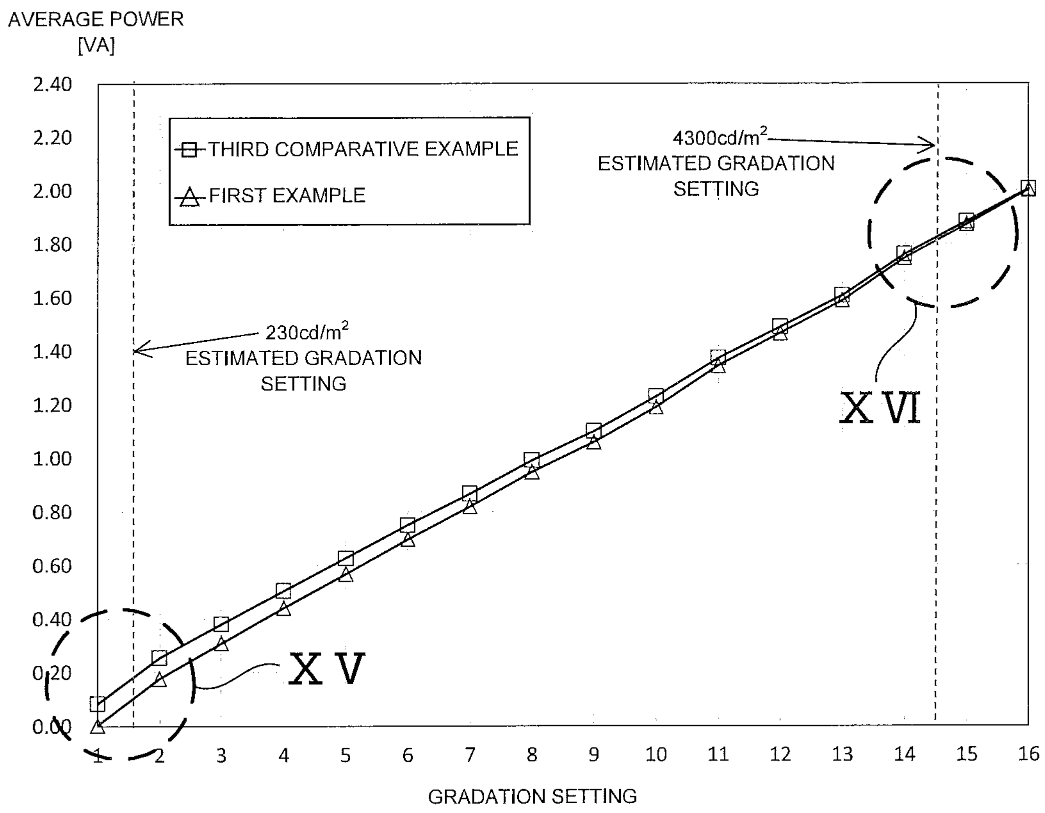
FIG. 14 is a graph showing average power consumption for each gradation when green and blue LEDs are lit in display devices according to a first example and a third comparative example.
Figure 15:
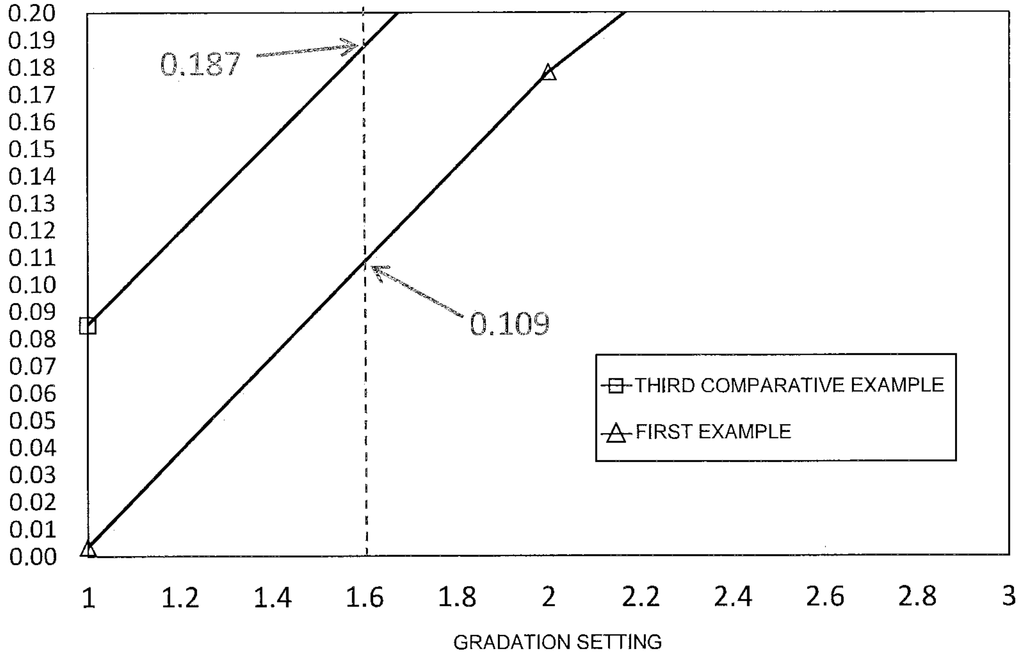
FIG. 15 is an enlarged view of a region indicated by XV in FIG. 14.
Figure 16:
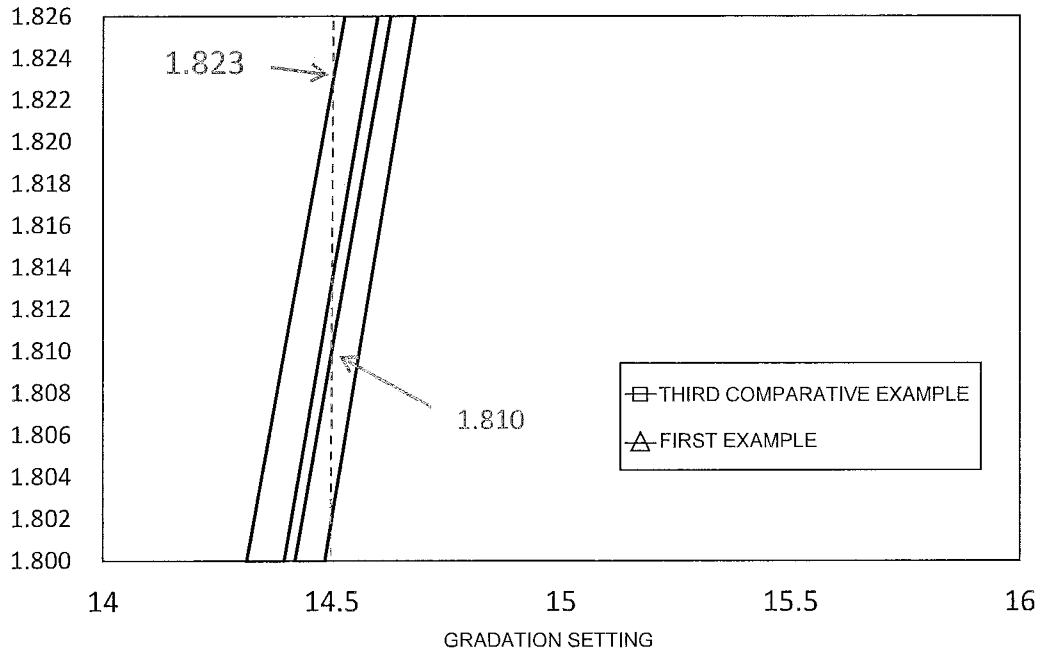
FIG. 16 is an enlarged view of a region indicated by XVI in FIG. 14.
Figure 17:
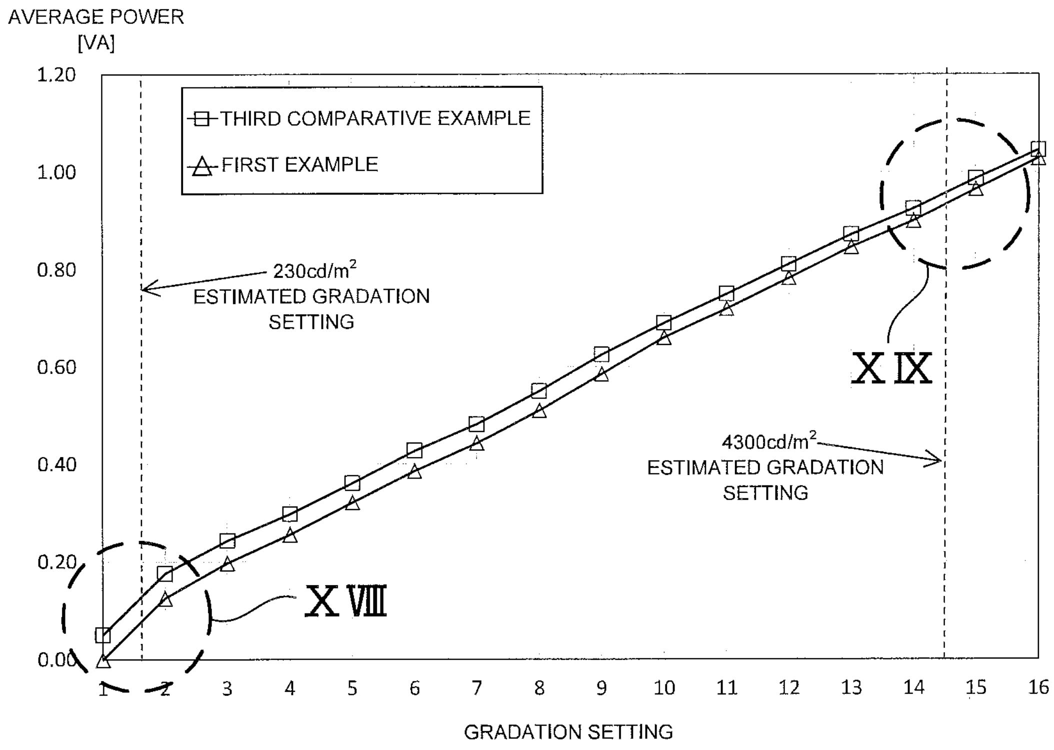
FIG. 17 is a graph showing average power consumption for each gradation when red LEDs are lit in the display devices according to the first example and the third comparative example.
Figure 18:
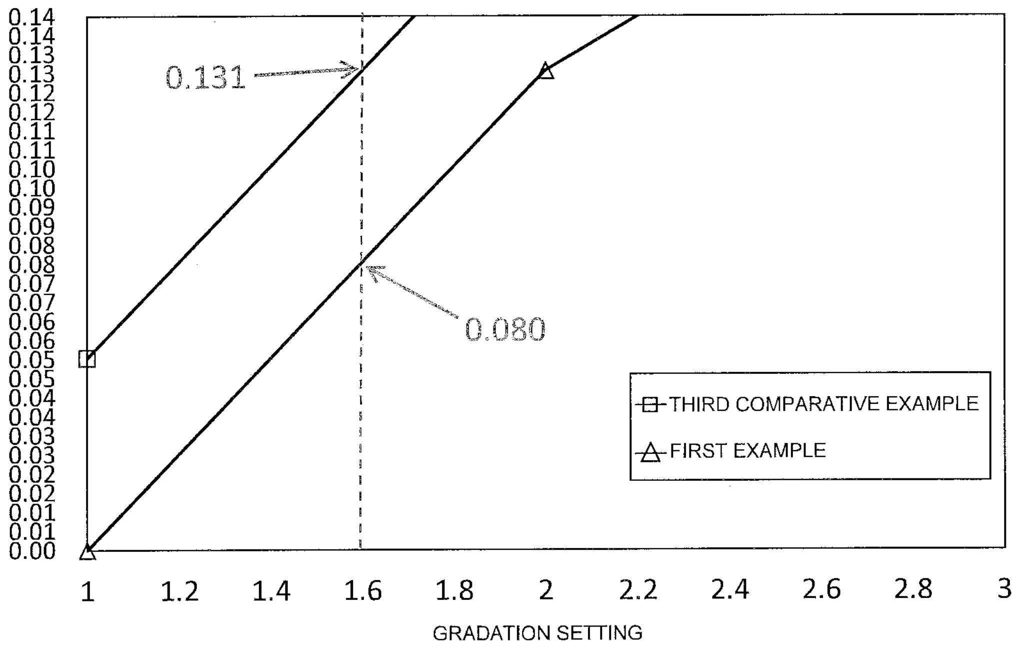
FIG. 18 is an enlarged view of a region indicated by XVIII in FIG. 17.
Figure 19:
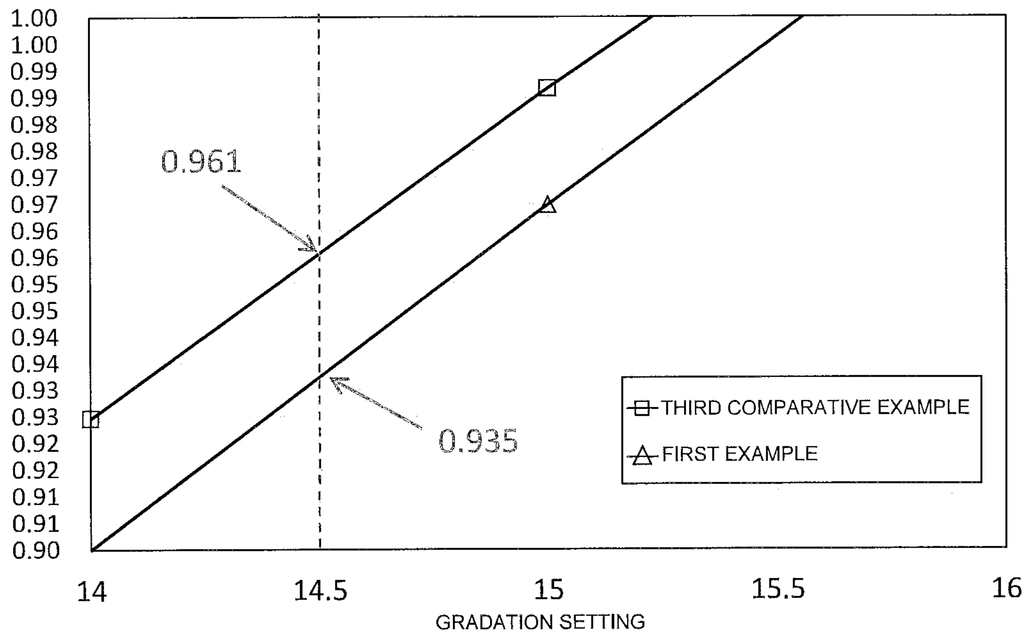
FIG. 19 is an enlarged view of a region indicated by XIX in FIG. 17.

FIG. 14 is a graph showing average power consumption for each gradation when the green and blue LEDs are lit in the display devices according to the first example and the third comparative example, FIG. 15 is an enlarged view of a region indicated by XV in FIG. 14, FIG. 17 is a graph showing average power consumption for each gradation when the red LEDs are lit in the display devices according to the first example and the third comparative example, FIG. 18 is an enlarged view of a region indicated by XVIII in FIG. 17, and FIG. 19 is an enlarged view of a region indicated by XIX in FIG. 17.

TABLE 1

| Gradation Setting | Third Comparative Example Average Power [VA] | First Example Average Power [VA] |
|---|---|---|
| 1 | 0.085 | 0.003 |
| 1.6 | 0.187 | 0.109 |
| 2 | 0.256 | 0.178 |
| 3 | 0.382 | 0.310 |
| 4 | 0.506 | 0.442 |
| 5 | 0.627 | 0.568 |
| 6 | 0.750 | 0.698 |
| 7 | 0.867 | 0.820 |
| 8 | 0.992 | 0.948 |
| 9 | 1.100 | 1.060 |
| 10 | 1.230 | 1.190 |
| 11 | 1.373 | 1.344 |
| 12 | 1.489 | 1.466 |
| 13 | 1.608 | 1.589 |
| 14 | 1.762 | 1.748 |
| 14.5 | 1.823 | 1.810 |
| 15 | 1.884 | 1.873 |
| 16 | 2.005 | 2.002 |

TABLE 2

| Gradation Setting | Third Comparative Example Average Power [VA] | First Example Average Power [VA] |
|---|---|---|
| 1 | 0.050 | 0.000 |
| 1.6 | 0.131 | 0.080 |
| 2 | 0.176 | 0.126 |
| 3 | 0.243 | 0.197 |
| 4 | 0.298 | 0.255 |
| 5 | 0.361 | 0.321 |
| 6 | 0.427 | 0.386 |
| 7 | 0.482 | 0.443 |

TABLE 2-continued

| Gradation Setting | Third Comparative Example Average Power [VA] | First Example Average Power [VA] |
|---|---|---|
| 8 | 0.550 | 0.510 |
| 9 | 0.625 | 0.585 |
| 10 | 0.690 | 0.660 |
| 11 | 0.749 | 0.719 |
| 12 | 0.811 | 0.782 |
| 13 | 0.872 | 0.846 |
| 14 | 0.925 | 0.900 |
| 14.5 | 0.961 | 0.935 |
| 15 | 0.987 | 0.965 |
| 16 | 1.045 | 1.028 |

TABLE 3

| Gradation Setting | Third Comparative Example Average Power [VA] | First Example Average Power [VA] |
|---|---|---|
| 1 | 0.135 | 0.003 |
| 1.6 | 0.318 | 0.189 |
| 2 | 0.432 | 0.304 |
| 3 | 0.625 | 0.507 |
| 4 | 0.803 | 0.697 |
| 5 | 0.988 | 0.889 |
| 6 | 1.178 | 1.083 |
| 7 | 1.349 | 1.263 |
| 8 | 1.542 | 1.458 |
| 9 | 1.725 | 1.645 |
| 10 | 1.920 | 1.850 |
| 11 | 2.122 | 2.063 |
| 12 | 2.300 | 2.249 |
| 13 | 2.479 | 2.435 |
| 14 | 2.686 | 2.648 |
| 14.5 | 2.784 | 2.745 |
| 15 | 2.871 | 2.837 |
| 16 | 3.051 | 3.030 |

As illustrated in FIGS. 14 to 19 and Tables 1 to 3, the total reduction of the green LED, the blue LED, and the red LED was about 0.13 [VA]. It was also confirmed that for all of the green LED, the blue LED, and the red LED, the average power is lower in the first example than in the third comparative example, particularly, the lower the gradation setting, the higher the reduction rate of the average power, and the power saving effect is high at low luminance with low gradation such as at the time of lighting in the nighttime. The result also shows that the influence of dark current in the vicinity of the front luminance 230 cd/$m^2$ can be substantially eliminated. Moreover, the power consumption reduction proportion was 40% lower in the first example than in the third comparative example.

The common line lighting period controller 43 sets the lighting period of the plurality of light-emitting elements connected to the respective common lines to a maximum lighting period in the plurality of light-emitting elements. Specifically, the common line lighting period controller 43 is connected to the memory 41 and pre-reads the memory 41, thereby determining the longest lighting period for each common line and determining a lighting period in which each common line is activated in accordance with this time. With such a configuration, since dark current flows in each common line for a necessary time, there is an advantage that the effect of reducing power consumption is increased especially at the time of low luminance when the proportion of dark current is increased.

It is also assumed that the lighting period is the maximum lighting period. That is, when the lighting period is different for each scanning line for scanning the common line, the light-emitting element can be lit in the maximum lighting period in which the light-emitting element can be lit. In this case, the common line lighting period controller 43 does not control the lighting period as a result.

The common line lighting period controller 43 does not necessarily pre-read the memory 41. For example, on the basis of the lighting period information, the common line lighting period controller 43 may be able to calculate the maximum lighting period among the plurality of light-emitting elements connected to the respective common lines. That is, by determining, for each common line, the longest lighting period among the lighting periods different for each common line by calculation, the lighting period in which each common line is activated can be set even without directly pre-reading the memory 41.

In the above example, an example of anode common connection has been described as a connection method of a plurality of light-emitting elements, that is, LEDs; however, the present disclosure is not limited to this configuration and it is needless to say that the present disclosure can also be applied to cathode common connection in the same manner.

The present disclosure can also be carried out in the following aspects.

Aspect 1

A display driving circuit for a display unit including a plurality of light-emitting elements connected along respective common lines and arranged in a matrix, the display driving circuit including:

- one or more element drivers configured to drive the plurality of light-emitting elements of the display unit;
- a memory configured to store lighting period information indicating a lighting period in which each light-emitting element of the plurality of light-emitting elements is lit by the one or more element drivers;
- an element lighting period controller configured to output the lighting period information stored in the memory to each element driver of the one or more element drivers;
- a switching unit configured to select each common line based on the lighting period information stored in the memory; and
- a common line lighting period controller that is interposed between the memory and the switching unit, the common line lighting period controller being configured to control a lighting period in which each common line is activated according to the lighting period information.

With the above configuration, the method of fixing the lighting period on the common line to the maximum lighting period as in related art is not used, but the common line is turned on in accordance with the lighting period of an element driver that actually lights a light-emitting element, so that unnecessary driving of the light-emitting element can be stopped and power consumption can be reduced. In particular, at the time of light emission at low luminance, the proportion of dark current is relatively high, and thus the dark current is suppressed and the power reduction effect is enhanced.

Aspect 2

The display driving circuit according to aspect 1, wherein the common line lighting period controller is configured to set a lighting period of the plurality of light-emitting elements connected to the respective common lines to a maximum lighting period among the plurality of light-emitting elements.

With the above configuration, since dark current flows in each common line only for a necessary time, there is obtained an advantage that the effect of reducing power consumption is increased especially at the time of low luminance when the proportion of dark current is increased.

Aspect 3

The display driving circuit according to aspect 1 or 2, wherein the common line lighting period controller is configured to calculate the maximum lighting period among the plurality of light-emitting elements connected to the respective common lines, on the basis of the lighting period information.

Aspect 4

The display driving circuit according to any one of aspects 1 to 3, wherein the lighting period information includes gradation data.

Aspect 5

The display driving circuit according to any one of aspects 1 to 4, wherein the common line lighting period controller is configured to cause a lighting period in which the common line is activated to coincide with a lighting period in which the light-emitting element is lit by the one or more element drivers.

Aspect 6

The display driving circuit according to any one of aspects 1 to 5, wherein

- the one or more element drivers is configured to perform passive driving of lighting the plurality of light-emitting elements by switching between the common lines, and
- the common line lighting period controller is configured to pre-read, from the memory, a lighting period of each light-emitting element connected to a common line to be selected by the one or more element drivers, and controls a lighting period of the common line when the one or more element drivers select the common line.

Aspect 7

The display driving circuit according to any one of aspects 1 to 6, wherein the switching unit includes:

- a switching element connected to each common line to energize the common line.

Aspect 8

The display driving circuit according to aspect 7, further including:

- a switching controller that is provided between the common line lighting period controller and the switching element the switching controller being configured to control the switching element.

Aspect 9

The display driving circuit according to aspect 8, wherein the switching element is a MOSFET, and the switching controller is a gate driving circuit connected to a gate electrode of the MOSFET.

Aspect 10

The display driving circuit according to any one of any one of aspects 7 to 9, wherein the switching unit includes:

an erroneous lighting prevention circuit that is connected to each switching element, the erroneous lighting prevention circuit being configured to suppress erroneous lighting of the plurality of light-emitting elements connected to a common line connected to the switching element and, the erroneous lighting prevention circuit including a charge path with one end grounded.

Aspect 11

The display driving circuit according to any one of aspects 1 to 10, wherein the one or more element drivers include:

a first element driver that drives a light-emitting element having a first emission color; and a second element driver that drives a light-emitting element having a second emission color different from the first emission color.

Aspect 12

The display driving circuit according to any one of aspects 1 to 11, wherein the common line lighting period controller, the memory, and the element lighting period controller are each formed by a control IC.

Aspect 13

A display device including:

a display unit including a plurality of light-emitting elements connected along respective common lines and arranged in a matrix;

one or more element drivers configured to drive the plurality of light-emitting elements;

a memory configured to store lighting period information indicating a lighting period in which each light-emitting element of the plurality of light-emitting elements is lit by the one or more element drivers;

an element lighting period controller configured to output the lighting period information stored in the memory to each element driver of the one or more element drivers;

a switching unit configured to select each common line based on the lighting period information stored in the memory; and a common line lighting period controller that is interposed between the memory and the switching unit, the common line lighting period controller being configured to control a lighting period in which each common line is activated according to the lighting period information.

With the above configuration, the method of fixing the lighting period on the common line to the maximum lighting period as in related art is not used, but the common line is activated turned on in accordance with the lighting period of an element driver that actually lights a light-emitting element, so that unnecessary driving of the light-emitting element can be stopped and power consumption can be reduced. In particular, at the time of light emission at low luminance, the proportion of dark current is relatively high, and thus the dark current is suppressed and the power reduction effect is enhanced.

Aspect 14

A road sign board using the display device according to aspect 13.

Aspect 15

A driving method for a display device including a display unit including a plurality of light-emitting elements connected along respective common lines and arranged in a matrix, one or more element drivers for driving the plurality of light-emitting elements, a memory that stores lighting period information indicating a lighting period in which each light-emitting element of the plurality of light-emitting elements is lit by the one or more element drivers, an element lighting period controller that outputs the lighting period information stored in the memory to each element driver of the one or more element drivers, and a switching unit that selects each common line of the common lines based on the lighting period information stored in the memory, the driving method including:

determining, by a common line lighting period controller interposed between the memory and the switching unit, a lighting period of each common line according to the lighting period information; and lighting each light-emitting element by driving the switching unit according to the lighting period in which each common line is activated determined by the common line lighting period controller.

Thus, the method of fixing the lighting period on the common line to the maximum lighting period as in related art is not used, but the common line is turned on in accordance with the lighting period of an element driver that actually lights a light-emitting element, so that unnecessary driving of the light-emitting element can be stopped and power consumption can be reduced. In particular, at the time of light emission at low luminance, the proportion of dark current is relatively high, and thus the dark current is suppressed and the power reduction effect is enhanced.

A display driving circuit, a display device, a road sign board, and a driving method for a display device according to the present disclosure can be used by being incorporated in a display device including pixels. For example, the present disclosure can be applied to data transfer interruption in road sign boards installed on expressways or general roads, display boards used at railroad stations, airports, and bus stops, and displays.

REFERENCE SIGNS LIST

1000, 1000', 4000, 5000, 11000, 12000 Display device

100 Driving circuit

100R Driving circuit for red LED

100G Driving circuit for green LED

100B Driving circuit for blue LED

1 Light-emitting element

1R First light-emitting element (red light-emitting element; red LED)

z1G Second light-emitting element (green light-emitting element; green LED)

1B Third light-emitting element (blue light-emitting element; blue LED)

10, 10', 10R, 10G, 10B Display unit

20 Element driver
20R Element driver for red (first element driver)
20G Element driver for green (second element driver)
20B Element driver for blue (third element driver)
21 Switch
22 Constant current source
30 Switching unit
30R First switching unit
30G Second switching unit
30B Third switching unit
31 Switching element
32 Switching controller
40, 40' Control IC
41, 41' Memory
42 Element lighting period controller
42R First element lighting period controller
42G Second element lighting period controller
42B Third element lighting period controller
43 Common line lighting period controller
43R First common line lighting period controller
43G Second common line lighting period controller
43B Third common line lighting period controller
50, 50A, 50B Erroneous lighting prevention circuit
51 Charging element
52 Charge path
53 Discharge path
56 Pre-charge FET
4100 Driving circuit
4020 Driver IC
4041 Memory
4042 Element lighting period controller
4030 Common driver
4031 Switching element
4032 Switching controller
4040 Control IC
5040 Control IC
CP0, CP1, CP2 Parasitic capacitance

What is claimed is:

1. A display driving circuit for a display unit including a plurality of light-emitting elements connected along respective common lines and arranged in a matrix, the display driving circuit comprising:
- one or more element drivers configured to drive the plurality of light-emitting elements of the display unit;
- a memory configured to store lighting period information indicating a lighting period in which each light-emitting element of the plurality of light-emitting elements is lit by the one or more element drivers;
- an element lighting period controller configured to output the lighting period information stored in the memory to each element driver of the one or more element drivers;
- a switching unit configured to select each common line of the common lines based on the lighting period information stored in the memory; and
- a common line lighting period controller interposed between the memory and the switching unit, the common line lighting period controller being configured to control a lighting period in which each common line is activated according to the lighting period information.

2. The display driving circuit according to claim 1, wherein the common line lighting period controller is configured to set the lighting period of the plurality of light-emitting elements connected to the respective common lines to a maximum lighting period among the plurality of light-emitting elements.

3. The display driving circuit according to claim 2, wherein the common line lighting period controller is configured to calculate the maximum lighting period among the plurality of light-emitting elements connected to the respective common lines based on the lighting period information.

4. The display driving circuit according to claim 3, wherein the lighting period information includes gradation data.

5. The display driving circuit according to claim 1, wherein the common line lighting period controller is configured to cause a lighting period in which the common line is activated to coincide with a lighting period in which the light-emitting element is lit by the one or more element drivers.

6. The display driving circuit according to claim 1, wherein
- the one or more element drivers is configured to perform passive driving to light the plurality of light-emitting elements by switching between the common lines, and
- the common line lighting period controller is configured to pre-read, from the memory, a lighting period of each light-emitting element connected to a common line to be selected by the one or more element drivers, and is configured to control a lighting period in which the common line is activated when the one or more element drivers select the common line.

7. The display driving circuit according to claim 1, wherein the switching unit comprises:
- a switching element connected to each common line to energize the common line.

8. The display driving circuit according to claim 7, further comprising:
- a switching controller provided between the common line lighting period controller and the switching element, the switching controller being configured to control the switching element.

9. The display driving circuit according to claim 8, wherein
- the switching element comprises a MOSFET, and
- the switching controller comprises a gate driving circuit connected to a gate electrode of the MOSFET.

10. The display driving circuit according to claim 7, wherein
- the switching unit comprises:
  - an erroneous lighting prevention circuit connected to each switching element, the erroneous lighting prevention circuit being configured to suppress erroneous lighting of the plurality of light-emitting elements connected to a common line connected to the switching element, the erroneous lighting prevention circuit including a charge path with one end grounded.

11. The display driving circuit according to claim 1, wherein
- the one or more element drivers comprise:
  - a first element driver configured to drive a light-emitting element having a first emission color; and
  - a second element driver configured to drive a light-emitting element having a second emission color different from the first emission color.

12. The display driving circuit according to claim 1, wherein the common line lighting period controller, the memory, and the element lighting period controller are formed by a control integrated circuit.

13. A display device comprising:
- a display unit including a plurality of light-emitting elements connected along respective common lines and arranged in a matrix;

one or more element drivers configured to drive the plurality of light-emitting elements;

a memory configured to store lighting period information indicating a lighting period in which each light-emitting element of the plurality of light-emitting elements is lit by the one or more element drivers;

an element lighting period controller configured to output the lighting period information stored in the memory to each element driver of the one or more element drivers;

a switching unit configured to select each common line of the common lines based on the lighting period information stored in the memory; and a common line lighting period controller interposed between the memory and the switching unit, the common line lighting period controller being configured to control a lighting period in which each common line is activated according to the lighting period information.

14. A road sign board using the display device according to claim 13.

15. A driving method for a display device comprising a display unit including a plurality of light-emitting elements connected along respective common lines and arranged in a matrix, one or more element drivers for driving the plurality of light-emitting elements, a memory storing lighting period information indicating a lighting period in which each light-emitting element of the plurality of light-emitting elements is lit by the one or more element drivers, an element lighting period controller configured to output the lighting period information stored in the memory to each element driver of the one or more element drivers, and a switching unit configured to select each common line of the common lines based on the lighting period information stored in the memory, the driving method comprising:

determining a lighting period of each common line according to the lighting period information by a common line lighting period controller interposed between the memory and the switching unit; and lighting each light-emitting element by driving the switching unit according to the lighting period in which each common line is activated determined by the common line lighting period controller.

* * * * *